(12) United States Patent
Motoyama et al.

(10) Patent No.: US 8,546,492 B2
(45) Date of Patent: Oct. 1, 2013

(54) SURFACE TREATMENT METHOD FOR WATER-ABSORBING RESIN AND PRODUCTION METHOD FOR WATER-ABSORBING RESIN

(75) Inventors: Atsushi Motoyama, Himeji (JP); Seiji Kato, Himeji (JP); Makoto Matsumoto, Himeji (JP); Takaaki Kawano, Suita (JP); Yoshio Irie, Himeji (JP)

(73) Assignee: Nippon Shokubai, Co., Ltd., Osaka (JP)

( * ) Notice: Subject to any disclaimer, the term of this patent is extended or adjusted under 35 U.S.C. 154(b) by 123 days.

(21) Appl. No.: 12/937,056

(22) PCT Filed: Apr. 10, 2009

(86) PCT No.: PCT/JP2009/057391
§ 371 (c)(1),
(2), (4) Date: Oct. 8, 2010

(87) PCT Pub. No.: WO2009/125849
PCT Pub. Date: Oct. 15, 2009

(65) Prior Publication Data
US 2011/0040044 A1 Feb. 17, 2011

(30) Foreign Application Priority Data
Apr. 11, 2008 (JP) ................. 2008-103891

(51) Int. Cl.
C08J 3/24 (2006.01)
C08L 33/02 (2006.01)
C08F 20/06 (2006.01)

(52) U.S. Cl.
USPC ............. 525/329.9; 525/329.7; 525/330.1; 525/374; 525/379; 525/381; 525/382; 525/384; 525/385

(58) Field of Classification Search
USPC ............ 525/329.7, 329.9, 330.1, 374, 379, 525/381, 382, 384, 385
See application file for complete search history.

(56) References Cited

U.S. PATENT DOCUMENTS

| | | | |
|---|---|---|---|
| 5,672,633 A | 9/1997 | Brehm et al. | |
| 6,143,821 A | 11/2000 | Houben | |
| 6,514,625 B1 | 2/2003 | DeMeuse | |
| 6,710,141 B1 | 3/2004 | Heide et al. | |
| 6,720,389 B2 | 4/2004 | Hatsuda et al. | |
| 6,906,159 B2 | 6/2005 | Dairoku et al. | |
| 2002/0061978 A1* | 5/2002 | Hatsuda et al. | 525/330.1 |
| 2003/0020199 A1* | 1/2003 | Kajikawa et al. | 264/140 |
| 2007/0149760 A1 | 6/2007 | Kadonaga et al. | |

FOREIGN PATENT DOCUMENTS

| | | |
|---|---|---|
| JP | 2002-121291 | 4/2002 |
| JP | 2002-201290 | 7/2002 |
| JP | 2002-212204 | 7/2002 |
| JP | 2003-82107 | 3/2003 |
| JP | 2008-38128 | 2/2008 |

OTHER PUBLICATIONS

Modern Superabsorbent Polymer Technology p. 97, Fig 3.9, WILEY-VCH.

* cited by examiner

Primary Examiner — Roberto Rabago
(74) Attorney, Agent, or Firm — Cesari and McKenna, LLP; Y. Rocky Tsao

(57) ABSTRACT

The present invention provides a surface treatment method for a water-absorbing resin comprising three steps of:
1) a humidifying and mixing step for mixing a base polymer and a surface cross-linking agent solution to obtain a "humidified substance"; 2) a pretreatment step for raising temperature of said humidified substance to obtain a "pretreated substance"; and 3) a surface cross-linking reaction step for cross-linking said pretreated substance to obtain a surface cross-linked "water-absorbing resin"; wherein dew point in the pretreatment step of the above 2) is from 50° C. to 95° C., and temperature of said humidified substance is raised from temperature below the dew point up to a temperature of 10° C. higher than the dew point.

20 Claims, 2 Drawing Sheets

SURFACE TREATMENT METHOD FOR WATER-ABSORBING RESIN AND PRODUCTION METHOD FOR WATER-ABSORBING RESIN

CROSS REFERENCE TO RELATED APPLICATIONS

This application is a National Stage of International Application No. PCT/JP2009/057391, filed on Apr. 10, 2009, which claims the priority of Japanese Application No. 2008-103891 filed Apr. 11, 2008. The content of the prior application mentioned above is incorporated herein by reference in its entirety.

TECHNICAL FIELD

The present invention relates to a surface treatment method in a production step of the water-absorbing resin, and a production method for water-absorbing resin. In more detail, the present invention relates to a surface treatment method for the water-absorbing resin, which is capable of producing the superior surface cross-linked water-absorbing resin having stable property.

BACKGROUND ART

The water-absorbing resin has been utilized widely in hygiene products such as disposable diapers, sanitary napkins and incontinent pads for adults, and various applications such as a water retention agent for soil, due to property of absorbing aqueous liquid in a large amount of from several times to several hundred times of own weight, and has been produced and consumed in a large amount. Such a water-absorbing resin (which is also referred to as a high water-absorbing resin, or a water-absorbing polymer) is described in Japanese Industrial Standard (JIS) K7223-1996, or introduced in many commercially available reference books.

In recent years, in applications to hygiene products such as, in particular, disposable diapers, sanitary napkins, incontinent pads for adults, there has been tendency to increase use amount of the water-absorbing resin and decrease use amount of pulp fiber, to make a thin product. Due to this tendency, it is necessary for the water-absorbing resin to bear a part of function of liquid permeation or diffusion conventionally performed by pulp in an absorbing body. As a known index for evaluating superiority or inferiority of such a function, absorbency or liquid permeability of the water-absorbing resin under pressure has been proposed, and those having higher value thereof have been desired. Further, this tendency of a thinner type also leads to increase in use amount of the water-absorbing resin per one piece of the hygiene product, therefore, request for a low cost water-absorbing resin has been increasing.

In general, the water-absorbing resin is obtained by obtaining a water-containing polymer by aqueous polymerization of a hydrophilic unsaturated monomer, and then by drying, pulverizing and classifying this. This is referred to as a base polymer in the present application. As the water-absorbing resin for application to hygiene products, usually the base polymer subjected to surface treatment is used. Surface treatment is performed generally by mixing a surface cross-linking agent solution to the base polymer and then by performing heat treatment. The present inventors have proposed a way for solving a problem in a surface treatment step, in our previous applications (refer to Patent Documents 1 to 4), however, the present application is one still more deepened and developed this. For example, in Patent Document 5, there has been disclosed a method for spraying a surface cross-linking agent solution in a hollow cone shape, or an ellipse cone shape showing both convex lens shape, under atmosphere with a dew point of equal to or lower than 60° C. and a temperature of equal to or higher than 90° C. to perform heat treatment of the water-absorbing resin.

PRIOR DOCUMENTS

Patent Documents

Patent Document 1: US-A-2007/0149760 specification
Patent Document 2: U.S. Pat. No. 6,906,159 specification
Patent Document 3: U.S. Pat. No. 6,710,141 specification
Patent Document 4: U.S. Pat. No. 6,143,821 specification
Patent Document 5: U.S. Pat. No. 6,720,389 specification Non-Patent Documents Non-Patent Document 1: Modern Superabsorbent Polymer Technology, p. 97, FIG. 3.9 WILEY-VCH.

SUMMARY OF THE INVENTION

Problem to be Solved by the Invention

However, the method according to Patent Document 5 not only does not provide objective property in surface treatment of the water-absorbing resin (for example, a water-absorbing resin powder substance with the moisture content of equal to or higher than 10% by weight) with a high moisture content, but also requires a large amount of energy to make atmosphere with a dew point of equal to or lower than 60° C. and a temperature of equal to or higher than 90° C., in heat treatment, and is thus not preferable.

In addition, it has been found that a product with constant property cannot be obtained necessarily when sampling and analyzing the water-absorbing resin produced in a commercial plant, and the present inventors have noticed the surface treatment step in searching the causes thereof.

Surface treatment of the water-absorbing resin usually comprises two steps: a humidifying and mixing step for mixing the base polymer and the surface cross-linking agent solution to obtain the "humidified substance", and a heat treatment step for heat treating said humidified substance to obtain a surface cross-linked water-absorbing resin. The present invention has been accomplished by the study on condition of the initial stage of this heat treatment step.

That is, it is an object of the present invention to produce stably the surface cross-linked water-absorbing resin having superior property (in particular, AAP or SFC), by finding suitable condition of an initial stage of a heat treatment step (a pretreatment step referred to in the present application).

In addition, it is another object of the present invention to produce, at low cost, a surface cross-linked water-absorbing resin with superior property from a base polymer with high moisture content.

Means for Solving the Problem

The present inventors have intensively studied a way to solve the above-described problems and, as a result, found a key factor in the initial stage of the heat treatment step (the pretreatment step referred to in the present application), and that the problem can be solved by controlling the factor within a suitable range. That is, the surface treatment method for the water-absorbing resin relevant to the present invention contains three steps of: 1) a humidifying and mixing step for mixing a base polymer and a surface cross-linking agent solution to obtain a "humidified substance"; 2) a pretreatment step for raising temperature of the humidified substance to obtain a "pretreated substance"; and 3) a surface cross-linking reaction step for cross-linking the pretreated substance to obtain a surface cross-linked "water-absorbing resin"; wherein dew point in the pretreatment step of the above 2) is from 50° C. to 95° C., and temperature of the humidified substance is raised from temperature below dew point up to the temperature 10° C. higher than the dew point.

Figure 1:
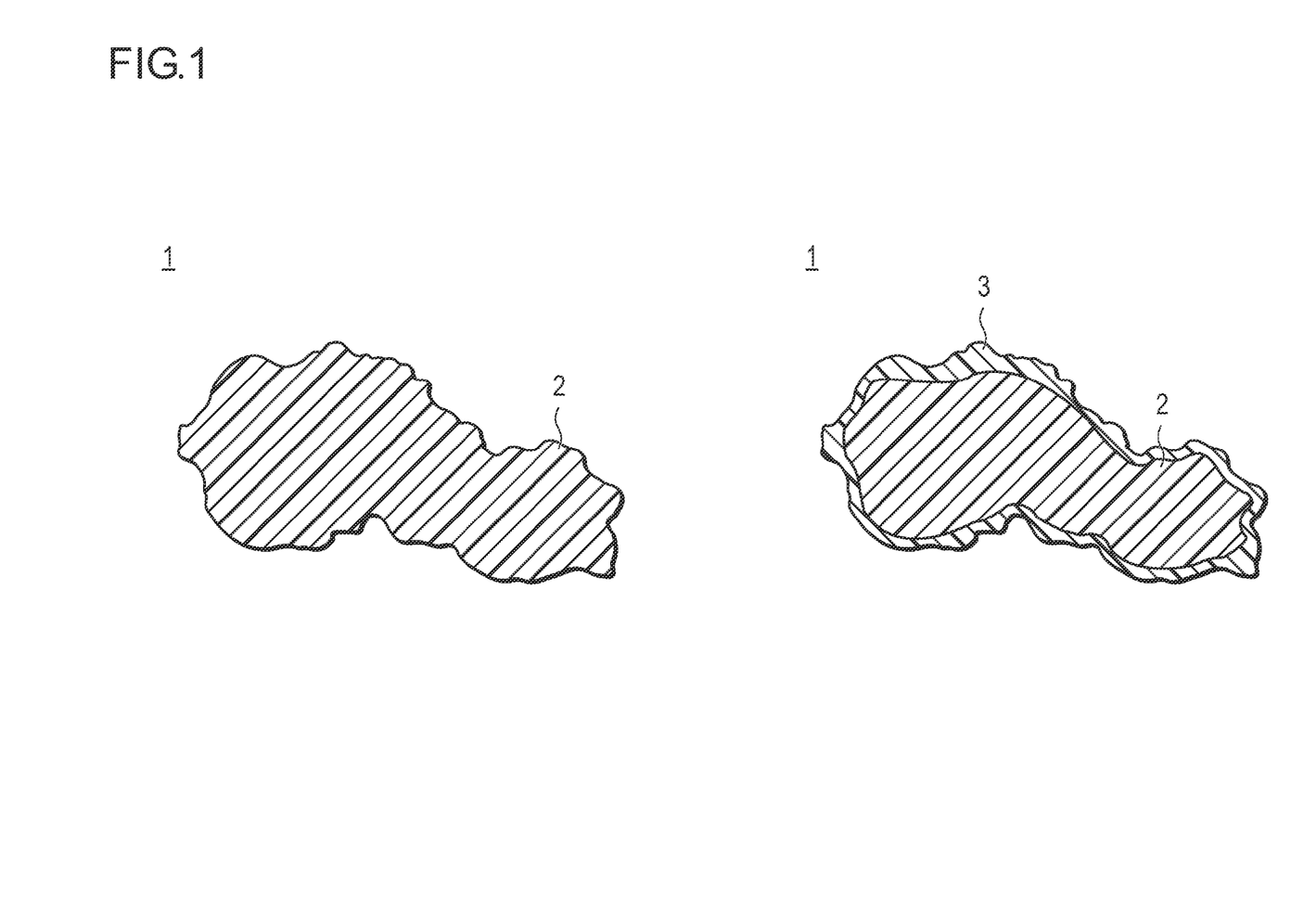
FIG. 1 is a conceptual view of the base polymer and the surface cross-linked water-absorbing resin, and it is described in Non-Patent Document: Modern Superabsorbent Polymer Technology, p. 97, FIG. 3.9 WILEY-VCH.

In Non-Patent Document 1, a cross-sectional view of a generally surface cross-linked water-absorbing resin is shown (refer to FIG. 1), and according to FIG. 1, a water-absorbing resin 1 is secondarily cross-linked thoroughly at a neighborhood of the surface 3 of a particle 2. However, it is considered practically that a surface cross-linking agent solution is adhered heterogeneously at the particle surface of the humidified substance obtained by mixing the base polymer and the surface cross-linking agent aqueous solution. When a surface cross-linking reaction is performed in this state as it is, it results in being present together parts with and without the secondary cross-linking at the particle surface. It is desirable that homogenization is attained by diffusion at the neighborhood of the particle surface before the surface cross-linking agent react with the polymer, and the pretreatment step referred to in the present application is a step for performing this homogenization.

Advantages of the Invention

The surface treatment method for the water-absorbing resin of the present invention exerts effect that the water-absorbing resin having stably superior property (in particular, AAP or SFC) can be produced efficiently, while ensuring high productivity at low cost.

MODE FOR CARRYING OUT THE INVENTION

The present invention is a surface treatment method for the water-absorbing resin containing three steps of: 1) a humidifying and mixing step for mixing a base polymer and a surface cross-linking agent solution to obtain a "humidified substance"; 2) a pretreatment step for raising temperature of the humidified substance to obtain a "pretreated substance"; and 3) a surface cross-linking reaction step for cross-linking the pretreated substance to obtain a surface cross-linked "water-absorbing resin"; and wherein dew point in the pretreatment step of the above 2) is from 50° C. to 95° C., and temperature of the humidified substance is raised from temperature below dew point up to the temperature 10° C. higher than the dew point.

Explanation will be given below in detail on the surface treatment method for the water-absorbing resin and the production method for the water-absorbing resin relevant to the present invention, however, the scope of the present invention should not be restricted by these explanations, and also as for embodiments other than the following exemplifications may be changed as appropriate and performed in a range not to impair the gist of the present invention. Specifically, the present invention should not be limited to each of the following embodiments, and various changes are possible within a range shown in the claims, and also embodiments, obtained by combining as appropriate technological means disclosed each in different embodiments, are encompassed within the technological range of the present invention.

(1) Definition of Terms (a) "The Water-Absorbing Resin"

In the present description, "the water-absorbing resin" means a water swelling and water insoluble polymer gelling agent, and one having the following properties. That is, it means a polymer gelling agent having an absorbency against non-pressure (CRC/specified in ERT441.2-02 (2002)) of essentially equal to or higher than 5 g/g, preferably 10 to 100 g/g, and further preferably 20 to 80 g/g, and in addition, extractable (specified in ERT470.2-02 (2002)) of essentially 0 to 50% by weight, preferably 0 to 30% by weight, further preferably 0 to 20% by weight, and particularly preferably 0 to 10% by weight. In addition, the water-absorbing resin is not especially limited, and may be set as appropriate depending on applications, however, a hydrophilic cross-linked polymer containing a carboxyl group is preferable. It should be noted that, said water-absorbing resin is not limited to a form where the whole amount (100% by weight) is a polymer, and may contain additives to be described later in a range to maintain the performance. In addition, in the present description, the CRC is the same meaning as synonymous as GV (absorbency against non-pressure) to be described later.

(b) "Polyacrylic Acid or the Salt Thereof"

In the present description, "polyacrylic acid or the salt thereof" means a polymer having acrylic acid or the salt thereof as a main component, as a repeating unit. Specifically, it means a polymer containing acrylic acid or the salt thereof essentially in 50 to 100% by mole, preferably 70 to 100% by mole, further preferably 90 to 100% by mole, particularly preferably substantially 100% by mole, as a monomer excluding a cross-linking agent. The salt of the polymer contains essentially an aqueous solution, and is preferably a monovalent salt, and further preferably an alkali metal salt or an ammonium salt. Among them, the alkali metal salt is preferable, and a sodium salt is particularly preferable.

(c) "EDANA" and "ERT"

"EDANA" is an abbreviation of European Disposables and Nonwovens Association, and "ERT" is an abbreviation of the measurement method (ERT/EDANA Recommended Test Methods) for the water-absorbing resin of an European standard (nearly a world standard). In the present description, unless otherwise specified, the ERT original (known document: revised in 2002) is referred when measuring properties of the water-absorbing resin.

(d) "The Particle"

In the present description, "the particle" means a solid having fluidity whose particle diameter is equal to or smaller than 5 mm, specified by sieve classification. Moisture content is not especially limited as long as it is a solid, however, usually it is below 30% by weight, and further preferably equal to or less than 20% by weight. In addition, the lower limit of the particle diameter is, for example, 1 nm. Further, it may be enough to have a certain fluidity as powders, for example, it means a solid whose Flow Rate (ERT450.2-02) can be measured, or a solid which can be sieve classified by (ERT420.2-02). Shape of the solid is not especially limited, and includes irregular shaped particles, spherical-shape, nearly spherical-shape, or a granulated substance (aggregated substance) thereof, however, preferably irregular shaped particles are included.

(d) The Humidified Substance

In the present description, the "humidified substance" means a mixture before being subjected to surface cross-linking which is obtained by adding an aqueous solution of a surface cross-linking agent to a water-absorbent resin (particularly, a particulate or powdery water-absorbent resin) and mixing them to have the aqueous solution of a surface cross-linking agent absorbed in the water-absorbent resin or coated on the surface of the water-absorbent resin.

It should be noted that, "humidification" in the present description is not limited to be conducted by the addition of only water or the addition of the surface cross-linking agent solution. Therefore, for example, when the surface cross-linking agent solution is an aqueous solution, it is not limited to be conducted by the addition of the aqueous solution. The "humidification" of this invention includes the addition of a surface cross-linking agent of itself if the surface cross-linking agent is in a liquid form, an organic solvent or an inorganic solvent (other than water). Further, a method for humidification is not limited to humidification by gas or a mist state of the surface cross-linking agent solution, and for example, showering, dropping, immersing or the like also corresponds to the humidification method of the present invention.

(f) "The Base Polymer"

In the present description, "the base polymer" means a water-absorbing resin (in particular, the particulate or powder water-absorbing resin) before being surface cross-linked.

It should be noted that, the case where the water-absorbing resin once surface cross-linked is surface cross-linked again may also be referred to as the base polymer in the present description.

(g) Others

In the present description, "mass", "% by mass" and "parts by mass" are synonymous to "weight", "% by weight" and "parts by weight", respectively, and property or the like was measured at room temperature (20 to 25° C.)/a relative humidity of 40 to 50%, unless otherwise specified. "Ton (t)" as a unit of weight means "Metric Ton", and "X to Y" showing a range indicates "to be equal to or higher than X and equal to or lower than Y".

(2) The Production Method for the Water-Absorbing Resin (the Base Polymer)

In the present invention, the objective water-absorbing resin is obtained by mixing the base polymer and the surface cross-linking agent solution to obtain the "humidified substance", and further by performing surface cross-linking treatment of said humidified substance. Accordingly, explanation will be given in detail, in the following description, on the base polymer which can be used in the present invention.

(a) The Polymerization Step

The base polymer which can be used in the present invention can be obtained by polymerization of a monomer which can be the base polymer by a polymerization reaction (polymer gel). It is not especially limited, as long as it is one which is able to be obtained by a polymerization reaction preferably using a monomer component essentially containing an ethylenic unsaturated monomer, and using a conventionally known method or the like, and can be obtained by the production methods described in Patent Documents 1 to 5 and the like, known by those skilled in the art.

The ethylenic unsaturated monomer which can be used in the present invention is not especially limited, however, a monomer having unsaturated double bond at the terminal is preferable. Specifically, for example, an anionic monomer such as (meth)acrylic acid, 2-(meth)acryloylethane sulfonic acid, 2-(meth)acryloylpropane sulfonic acid, 2-(meth)acrylamido-2-methylpropane sulfonic acid, vinyl sulfonic acid, methylsulfonic acid, (maleic anhydride) or maleic acid, itaconic acid, cynamiic acid, allyltoluene sulfonic acid, vinyltoluene sulfonic acid, 2-hydrokyethyl(meth)acryloyl phosphate, and a salt thereof; a nonionic hydrophilic group-containing monomer such as (meth)acrylamide, N-substituted (meth)acrylamide (for example, N-ethyl(meth)acrylamide, N,N-dimethyl(meth)acrylamide), 2-hydroxyethyl(meth)acrylate, 2-hydroxypropyl(meth)acrylate, an amino group-containing unsaturated monomer such as N,N-dimethylaminoethyl(meth)acrylate, N,N-dimethylaminopropyl(meth)acrylate, N,N-diethylaminoethyl(meth)acrylate, N,N-diethylaminopropyl(meth)acrylate, N,N-dimethylaminopropyl(meth)acrylamide or a quaternized compound thereof; and the like are included, and one or more kinds selected from among these groups may be used. Among these, (meth)acrylic acid, 2-(meth)acryloylethane sulfonic acid, 2-(meth)acrylamido-2-methylpropane sulfonic acid and a salt thereof, N,N-dimethylaminoethyl(meth)acrylate, a quaternized compound of N,N-dimethylaminoethyl(meth)acrylate, and (meth)acrylamide are preferable, and acrylic acid and/or a salt thereof is particularly preferable. It should be noted that, acrylic acid which can be used in the present invention is not especially limited, and conventionally known acrylic acid is used preferably. Specifically, acrylic acid described in US-A-2001/0016668 specification and U.S. Pat. No. 6,596,901 specification, as a polyacrylic acid or the salt thereof-based water-absorbing resin, may be used.

In the present invention, when an acrylate salt is used as the monomer, in view of water-absorbing performance of the resultant polyacrylic acid or the salt thereof-based water-absorbing resin, a monovalent salt of acrylic acid selected from among an alkali metal salt, an ammonium salt, and an amine salt of acrylic acid is preferable. An alkali metal salt of acrylic acid is more preferable, and an acrylate salt selected from among a sodium salt, lithium salt and potassium salt is still more preferable, and among them a sodium salt is preferable in view of cost.

In addition, when acrylic acid and/or a salt thereof is used as a main component, content of acrylic acid and/or the salt thereof is not especially limited, however, preferably equal to or more than 70% by mole, more preferably equal to or more than 80% by mole, further preferably equal to or more than 90% by mole, and particularly preferably equal to or more than 95% by mole relative to total monomer components (excluding an internal cross-linking agent to be described later) (the upper limit is 100% by mole).

In addition, in producing the water-absorbing resin, a monomer component other than the above monomer may be used in a range not to impair effect of the present invention. For example, an aromatic ethylenic unsaturated monomer with a carbon atoms of 8 to 30, an aliphatic ethylenic unsaturated monomer with a carbon atoms of 2 to 20, an alicyclic ethylenic unsaturated monomer with a carbon atoms of 5 to 15, hydrophobic monomers such as an alkyl(meth)acrylate with an alkyl group carbon atoms of 4 to 50 and the like may be exemplified. Ratio of these hydrophobic monomers is, in general, within a range of 0 to 20 parts by weight relative to 100 parts by weight of the ethylenic unsaturated monomer. The hydrophobic monomers of over 20 parts by weight may decrease water absorption performance of the resultant water-absorbing resin.

In addition, in the polymerization step according to the present invention, an internal cross-linking agent may be used as needed. The water-absorbing resin obtained by the present invention becomes water insoluble by formation of internal cross-linking. Such an internal cross-linking may be a self cross-linking-type not using a cross-linking agent, however, it may be formed by using the internal cross-linking agent having two or more polymerizable unsaturated groups and/or two or more reactive functional groups in one molecule.

Such an internal cross-linking agent is not especially limited, and includes, for example, N,N'-methylenebis(meth)acrylamide, N-methylol(meth)acrylamide, glycidyl(meth)acrylate, (poly)ethylene glycol di(meth)acrylate, (poly)propylene glycol di(meth)acrylate, glycerin tri(meth)acrylate, glycerin acrylate methacrylate, a polyvalent metal salt of (meth)acrylic acid, trimethylolpropane tri(meth)acrylate, triallyl amine, triallyl cyanurate, triallyl isocyanurate, triallyl phosphate, ethylene glycol diglycidyl ether, (poly)glycerol diglycidyl ether, polyethylene glycol diglycidyl ether, trimethylolpropane di(meth)acrylate, ethylene oxide modified trimethylolpropane tri(meth)acrylate, pentaerythritol tetra(meth)acrylate, dipentaerythritol hexa(meth)acrylate, poly(meth)allyoxy alkane, glycerol diglycidyl ether, ethylene glycol, polyethylene glycol, propylene glycol, glycerin, 1,4-butanediol, pentaerythritol, ethylene diamine, ethylene carbonate, propylene carbonate, polyethylene imine, or the like. These internal cross-linking agents may be used alone or two or more kinds may be used in combination. Among these, in consideration of water-absorbing characteristics of the resultant water-absorbing resin, it is preferable to use essentially a compound having two or more polymerizable unsaturated groups, as the internal cross-linking agent.

In the present invention, use amount of the internal cross-linking agent may be determined as appropriate depending on desired property of the water-absorbing resin, however, usually use amount of the internal cross-linking agent is preferably 0.0001 to 1% by mole, more preferably 0.001 to 0.5% by mole, and still more preferably 0.005 to 0.2% by mole, relative to total amount of the monomer components (whole monomers) to be used in producing the water-absorbing resin. The amount below 0.0001% by mole does not introduce internal cross-linking agent into the water-absorbing resin, on the other hand, the amount over 1% by mole increases a gel strength of the water-absorbing resin and could decrease absorbency. When a cross-linked structure is introduced inside a polymer using the internal cross-linking agent, the internal cross-linking agent may be added to a reaction system before polymerization, during polymerization, or after polymerization of the monomer, or after neutralization.

In the polymerization step, as needed, a radical polymerization initiator may be used. By action of a radical of this polymerization initiator, polymerization of the monomer component is promoted. This radical polymerization initiator is not especially limited, and one or more kinds may be selected and used from among those utilized in polymerization of the usual water-absorbing resin, depending on kind of the monomer to be polymerized, polymerization conditions and the like. For example, a thermal decomposition-type initiator (for example, a persulfate such as a sodium persulfate, a potassium persulfate, an ammonium persulfate; a peracetate such as a potassium peracetate, a sodium peracetate; a percarbonate such as a potassium percarbonate, a sodium percarbonate; a peroxide such as a hydrogen peroxide, a t-butylperoxide, a t-butylhydroperoxide, a methyl ethyl ketone peroxide; an azo compound such as an azonitrile compound, an azoamidine compound, a cyclic azoamidine compound, an azoamide compound, an alkylazo compound, 2,2'-azobis(2-amidinopropane)dihydrochloride, 2,2'-azobis[2-(2-imidazoline-2-yl) propane]dihydrochloride; and the like or a photo-decomposition-type initiator (for example, a benzoin derivative, a benzyl derivative, an acetophenone derivative, a benzophenone derivative, an azo compound, 2-hydroxy-2-methyl-1-phenyl-propane-1-one or the like); and the like may be included. Among these, in view of cost and capability of reducing residual monomer, the thermal decomposition type initiator is preferable, and a persulfate salt is particularly preferable. In addition, because combined use of a reducing agent can promote decomposition of the radical polymerization initiator, it is possible to make a redox-type initiator by combining both. The reducing agent is not especially limited, however, for example, sulfite or the salt thereof (for example, sodium sulfite, potassium sulfite, ammonium sulfite or the like), hydrogen sulfite or the salt thereof (for example, sodium hydrogen sulfite, potassium hydrogen sulfite, ammonium hydrogen sulfite or the like), pyrosulfite or the salt thereof, L-ascorbate or the salt thereof, a reductive metal or the salt thereof such as ferrous salt or the like; dithionite or the salt thereof, trithionate or the salt thereof, tetrathionate or the salt thereof, thiosulfate or the salt thereof, dimethylsulfoxide, phosphite or the salt thereof, nitrite or the salt thereof, thiourea dioxide, amino acid, amines (ethanolamine or the like), or the like is included. More preferable one is combined use of the thermal decomposition-type initiator and the photodecomposition-type initiator.

Use amount of the radical polymerization initiator is not especially limited, however, usually 0.001 to 2% by weight is preferable, and 0.01 to 0.5% by weight is more preferable relative to use amount of the monomer. The use amount of the radical polymerization initiator of below 0.001% by weight increases the unreacted monomer, and increases amount of residual monomers in the resultant water-absorbing resin, and thus is not preferable. On the other hand, said use amount of over 2% by weight increases water-soluble components in the resultant water-absorbing resin, and is thus not preferable.

In the polymerization step, when the monomer is used as an aqueous solution, concentration of the monomer in said aqueous solution (hereafter, may be referred to as "a monomer solution" as well) is not especially limited, however, preferably in a range of 15 to 90% by weight, and more preferably in a range of 35 to 80% by weight. The concentration below 15% by weight increases water content of the resultant hydrogel and requires amount of heat or time for drying, and is thus disadvantageous.

A polymerization method of the present invention is not especially limited, and a known method, for example, aqueous solution polymerization, reversed phase suspension polymerization, precipitation polymerization, bulk polymerization or the like can be adopted. Among them, in view of easiness of polymerization reaction control or performance of the resultant water-absorbing resin, aqueous solution polymerization, where the monomer is dissolved in an aqueous solution, or reversed phase suspension polymerization is preferable. This production method exerts this effect sufficiently in the water-absorbing resin obtained in aqueous solution polymerization. From this view point, aqueous solution polymerization, in particular continuous aqueous solution polymerization is preferably used. In the continuous aqueous solution polymerization, the continuous belt polymerization or continuous kneader polymerization is suitably used. That is, in the present invention, the base polymer is preferably to be the polyacrylic acid or the salt thereof-based water-absorbing resin obtained by the continuous belt polymerization or continuous kneader polymerization.

The polymerization reaction is initiated by using the above-described polymerization initiator. Alternatively, the polymerization reaction is initiated by activated energy such as ultraviolet ray, electron beams and γ-rays or the like alone, or by combined use with the polymerization initiator, other than the above-described polymerization initiator.

Temperature in polymerization initiation and temperature in polymerization in the polymerization step is not especially limited and depends on kind of the polymerization initiator to be used, however, preferably in a range of 15 to 130° C., and more preferably in a range of 20 to 120° C. The polymerization temperature outside the range increases amount of the residual monomer of the resultant water-absorbing resin, progresses an excessive self cross-linking reaction and could decrease water-absorption performance of the water-absorbing resin, and thus is not preferable. In addition, polymerization time is also not especially limited, and may be determined as appropriate depending on kinds of the monomers and the polymerization initiator, polymerization temperature, or the like. In addition, the above-described polymerization is performed usually under normal pressure, in view of easiness of operation thereof, however, in order to decrease polymerization temperature, it is also a preferable aspect that polymerization is performed in a reduced pressure state.

The reversed phase suspension polymerization is a polymerization method for suspending the aqueous monomer solution in a hydrophobic organic solvent, and is described, for example, in US patent such as U.S. Pat. No. 4,093,776, U.S. Pat. No. 4,367,323, U.S. Pat. No. 4,446,261, U.S. Pat. No. 4,683,274, U.S. Pat. No. 5,244,735. In addition, the aqueous solution polymerization is a method for polymerizing the aqueous monomer solution polymerization without using a disperse solution, and is described, for example, in US patent such as U.S. Pat. No. 4,625,001, U.S. Pat. No. 4,873,299, U.S. Pat. No. 4,286,082, U.S. Pat. No. 4,973,632, U.S. Pat. No. 4,985,518, U.S. Pat. No. 5,124,416, U.S. Pat. No. 5,250,640, U.S. Pat. No. 5,264,495, U.S. Pat. No. 5,145,906, U.S. Pat. No. 5,380,808, or Europe patent such as EP No. 0811636, EP No. 0955086, EP No. 0922717. Monomers or initiators exemplified in the polymerization methods described in these Patent Documents are also preferably applicable in the present invention.

It should be noted that, when aqueous solution polymerization is performed, a partially neutralized substance of acrylic acid or the like may be polymerized, or after polymerization of a monomer containing an acid group such as acrylic acid, the polymerized substance may be neutralized with an alkaline compound such as sodium hydroxide or sodium carbonate. In this case, neutralization rate (% by mole of the acid group neutralized in the whole acid groups) of the resultant water-absorbing resin is preferably 25 to 100% by mole, more preferably 50 to 90% by mole, still more preferably 50 to 75% by mole, and particularly preferably 60 to 70% by mole.

In addition, when the aqueous solution polymerization or reversed phase suspension polymerization is performed, a solvent other than water may be used in combination, as needed. It should be noted that, kind of the solvent to be used in combination is not especially limited. Further, a polymerization inhibitor or an iron component may be contained in these monomers. As content of the iron component, equal to or less than 5 ppm by weight is preferable, and equal to or less than 1 ppm by weight is more preferable. In addition, the polymerization inhibitor is not especially limited; however, for example, methoxy phenols may be used preferably. In this case, use amount of the polymerization inhibitor is equal to or less than 160 ppm by weight, which has been disclosed in U.S. Pat. No. 7,049,366.

Still more, in the polymerization step, as needed, various foaming agents such as a carbonate (hydrogen) salt, carbon dioxide, an azo compound, an inert organic solvent; a hydrophilic polymer such as starch-cellulose, a derivative of starch-cellulose, polyvinyl alcohol, polyacrylic acid or the salt thereof, a cross-linked substance of polyacrylic acid or the salt thereof; various surfactants; a chain transfer agent such as hypophosphorous acid or the salt thereof; or the like, may be added to the reaction system, as appropriate, within a range not to impair effect of the present invention (for example, the various foaming agents in equal to or lower than 30 parts by weight, the hydrophilic polymer in equal to or lower than 30 parts by weight, and the chain transfer agent in equal to or lower than 1 part by weight relative to 100 parts by weight of the monomer).

(b) The Drying Step

In the drying step in the present invention, the polymer gel with a moisture content of 15 to 70% by weigh, obtained in the above-described polymerization step is dried. Although not limited to the following description, the polymer gel obtained in the polymerization step is preferably supplied to the drying step, usually in a particulate state of about 0.1 to 5 mm. Therefore, when the polymer gel is larger than the above size, it is preferable to perform crushing treatment in advance before the drying step. The crushing means is not especially limited; however, for example, various cutting means such as a cutter mill, a meat chopper, a roller-type cutter, a guillotine cutter, a slicer, a roll cutter, a shredder, scissors, may be used alone or in combination as appropriate.

A drying method in said drying step is not especially limited and a method for using a usual dryer or a heating furnace such as hot air drying, azeotropic dewatering may be adopted widely. In more specifically, as the drying apparatus, a conductive heat transfer-type dryer, a radiation heat transfer-type dryer, a hot air heat transfer-type dryer, an inductive heating dryer, or the like is exemplified. In view of speed of drying, the hot air heat transfer-type dryer (hereafter, may be referred to as a hot air dryer) is preferable. As this hot air dryer, a drying apparatus such as a through-flow zone-type, a through-flow circuit-type, a through-flow vertical-type, a parallel flow zone-type, a through-flow tunnel-type, a through-flow groove-type, a fluidized bed-type, an air flow-type, a spray-type is included. Among them, in view of easiness of property control of the water-absorbing agent, the through-flow zone-type is preferable. It should be noted that, there was observed tendency of property decrease by increase in a production scale, even in such a through-flow zone-type dryer, however, because application of the present invention is capable of solving such a problem even in drying with the through-flow zone-type dryer, it is applicable suitably.

As drying temperature in the drying step, setting at relatively high temperature is preferable, specifically 80 to 300° C., preferably 100 to 220° C., and particularly preferably 120 to 200° C. It should be noted that, drying time is specified by temperature of heating medium (for example, temperature of hot air), however, when it is not specified by temperature of heating medium, such as microwave, it is not specified by temperature of a material. Drying time is not especially limited, and for example, 1 (one) second to 10 hours is preferable and 1 minute to 3 hours is more preferable, however, drying time may be set so as to attain desirable solid content rate of the resultant dried substance. It is preferable that solid content rate of the dried substance obtained in said drying step (value determined from reduced amount by drying, obtained by drying at 180° C. for 3 hours) is equal to or higher than 90% by weight, in view of easiness of pulverization. In general, in view of production efficiency, it is preferable that said drying time is usually within two hours, although it depends on particle diameter of the polymer gel, drying temperature, air volume or the like.

(c) The Pulverization Step

The pulverization step in the present invention is the step for pulverizing the polymer gel or a dried substance thereof. Pulverization is usually performed for a dried substance of the polymer gel obtained in the drying step, however, it may be performed for the polymer gel obtained in the polymerization step before drying. By this pulverization, the water-absorbing resin (the base polymer) as a pulverized substance is obtained. Said pulverization is preferably performed so that the water-absorbing resin with desired particle diameter (preferably, a weight average particle diameter of 200 to 800 μm) can be obtained as many as possible. A method for pulverization is not especially limited, and a conventionally known method can be adopted. Because of generation of the fine powders by this pulverization, the fine powders are included in the water-absorbing resin obtained in the pulverization step. It should be noted that, when particle diameter of the water-absorbing resin obtained in the drying step is small, it is not necessary to perform this pulverization step.

The water-absorbing resin (the base polymer) obtained via the pulverization step becomes an irregular shaped substance (irregular shaped particles), however, such a shape is preferable due to providing large specific surface area, and makes fixing to pulp easy as well. That is, it is preferable that the water-absorbing resin (the base polymer) is an irregular shaped substance (irregular shaped particles).

As the pulverization method, the dried substance may be pulverized and classified to control particle diameter. These methods have been disclosed, for example, in US-A-2006/024755. In addition, as a pulverization machine which can be used in the pulverization, for example, among names of pulverization machines classified in Table 1.10 in The Powder Engineering Handbook (edited by the Powder Engineering Association, initial version), one classified to a shear rough crusher, an impact crusher, a high speed rotation-type pulverization machine, and having one or more mechanisms among pulverization mechanisms of cutting, shearing, impact or friction, can be used preferably, and among pulverization machines corresponding to such machine types, pulverization machines, where cutting and shear mechanisms are main mechanisms, can be used particularly preferably. For example, as the pulverization machine, there is a pin mill, a roll mill, a roll granulator or the like. Among them, in view of a particle size control aspect, a roll mill (a roll rotation-type pulverization machine), or a roll granulator can be used suitably, and a one-stage, preferably multi-stage, still more 2 to 5-stage roll mill or a roll granulator is applicable to pulverization. Average particle diameter of the dried substance before pulverization is 0.5 to 50 mm, and still more 1 to 5 mm, and is adjusted to the following particle diameter after pulverization.

Next, a dried substance pulverized as above is classified.

(d) The Classification Step

The classification step in the present invention is a step for classifying the pulverized substance obtained in the pulverization step, or the dried substance. In the classification step, the pulverized substance is sieved. In said classification step, objective water-absorbing resin is obtained by selecting particles having desired particle diameters (preferably, a weight average particle diameter of 200 to 800 μm). A classification method is not especially limited and a conventionally known method can be adopted.

A classification method for the water-absorbing resin is not especially limited, however, it is exemplified in U.S. Pat. No. 6,164,455, WO 2006/074816, WO 2008/037672, WO 2008/037673, WO 2008/037675, WO 2008/123477 or the like. Among these, in particular, a sieve classification is applied, and number of sieves may be determined as appropriate from about 2 to 5 stages.

(e) The Base Polymer

The base polymer obtained by the above production method is preferably to be particulate or powder-like. In addition, it is preferably a polyacrylic acid or the salt thereof-based water-absorbing resin. Size of the base polymer is not especially limited, however, for example, in the case of being particulate or powder-like, weight average molecular weight (D50) is preferably 10 to 1000 μm, more preferably 150 to 850 μm, still more preferably 200 to 600 μm, particularly preferably 250 to 500 μm, and most preferably 350 to 450 μm. The weight average molecular weight of below 10 μm is not preferable in view of safety sanitation. On the other hand, the case of over 1000 μm could not be used in hygiene products such as disposable diapers and the like.

In addition, when the water-absorbing resin having a particle diameter of over 850 μm is surface-treated and then is used in the disposable diapers and the like, skin touch feeling becomes poor and a top sheet of the disposable diapers may be broken. On the other hand, when particles smaller than 150 μm exceeds 10% by weight, water absorbing performance of the surface treated water-absorbing resin may be decreased because the fine powders may scatter or a clogging may occur in the use of the disposable diapers. Therefore, particles smaller than 150 μm is better as low as possible, and content of particles below 150 μm is usually 0 to 5% by weight, preferably 0 to 3% by weight, and particularly preferably 0 to 1% by weight. In addition, particles of over 850 μm is better as low as possible, and is usually 0 to 5% by weight, preferably 0 to 3% by weight, and particularly preferably 0 to 1% by weight. In addition, ratio of particles with a weight average molecular weight (D50) of 150 to 850 μm (specified by sieve classification) is preferably 90 to 100% by weight, more preferably 95 to 100% by weight, and particularly preferably 98 to 100% by weight. By controlling particle size within a range of the upper limit and the lower limit, a problem related to coloring of the resultant water-absorbing resin can be suppressed significantly.

In addition, logarithm standard deviation ($\sigma\zeta$) of particle size distribution of the base polymer obtained in the present invention is preferably 0.2 to 0.6, more preferably 0.2 to 0.5, still more preferably 0.2 to 0.4, particularly preferably 0.27 to 0.4, and most preferably 0.3 to 0.4. As for these measuring methods, as a method for using a standard sieve, for example, it is described in WO 2004/069915 or EDANA-ERT420.2-02.

It is preferable that an uncross-linked polymer present in the base polymer obtained in this way, namely the amount of the soluble components is preferably equal to or lower than 30% by weight, more preferably equal to or lower than 20% by weight, and still more preferably equal to or lower than 10% by weight (the lower limit is 0% by weight).

In addition, absorbency against non-pressure (GV: specified by Examples) of the base polymer obtained is preferably 20 to 50 g/g, more preferably 25 to 50 g/g, and still more preferably 30 to 50 g/g.

In addition, moisture content of the base polymer of the present invention is not especially limited, as long as the base polymer is particulate or powder-like, however, preferably 2 to 30% by weight, more preferably 5 to 20% by weight, and still more preferably 10 to 15% by weight.

It should be noted that, in the present description, "moisture content" is calculated by the following method. That is, 2 g of a sample (the base polymer) is put in a Petri dish and stood still in a convection-type dryer at 180° C. for 3 hours, and then it is calculated from reduced amount by drying.

(3) The Surface Treatment Method for the Water-Absorbing Resin (a) The Surface Cross-Linking Agent In the present invention, the "humidified substance" is obtained by mixing the base polymer and the surface cross-linking agent solution. Explanation will be given here on the surface cross-linking agent which can be used. As said surface cross-linking agent, various organic surface cross-linking agents or inorganic surface cross-linking agents can be exemplified, however, in view of property or handling characteristics, a cross-linking agent reactable with a carboxyl group is preferable. For example, a polyhydric alcohol, an epoxy compound, a polyvalent amine compound, a halo-epoxy compound, a condensed compound of the polyvalent amine compound and the halo-epoxy compound, an oxazolidinone compound, an alkylene carbonate compound and a cyclic urea compound is included.

As the surface cross-linking agent, specifically, a conventionally known one exemplified in U.S. Pat. No. 6,228,930, U.S. Pat. No. 6,071,976, U.S. Pat. No. 6,254,990 or the like may be used. In more specifically, there is included a polyhydric alcohol compound such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,4-butanediol, 1,5-pentanediol, 1,6-hexanediol, 1,2-cyclohexanedimethanol, 1,2-cyclohexanediol, trimethylol propane, diethanol amine, triethanol amine, polyoxypropylene, an oxyethylene-oxypropylene block copolymer, pentaerythritol, sorbitol; an epoxy compound such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, glycidol; a polyvalent amine compound such as ethylenediamine, diethylenetriamine, triethylenetetramine, tetraethylenepentamine, pentaethylenehexamine, polyethyleneimine, polyamide polyamine, or an inorganic salt or an organic salt (an aziridinium salt or the like) thereof; a halo-epoxy compound such as epichlorohydrin, epibromohydrin, α-methylepichlorohydrin; a condensed compound of the polyvalent amine compound and the halo-epoxy compound; an oxazolidinone compound such as 2-oxazolidinone (exemplified in U.S. Pat. No. 6,559,239); an alkylene carbonate compound such as ethylene carbonate; an oxetane compound (exemplified in US-A-2002/72471); a cyclic urea compound such as 2-imidazolidinone; a polyvalent isocyanate compound such as 2,4-tolylene diisocyanate, hexamethylene diisocyanate; a polyvalent oxazoline compound such as 1,2-ethylene-bis-oxazoline or the like; an alkylene carbonate compound such as 1,3-dioxolane-2-one, 4-methyl-1,3-dioxolane-2-one, 4,5-dimethyl-1,3-dioxolane-2-one, 4,4-di-methyl-1,3-dioxolane-2-one, 4-ethyl-1,3-dioxolane-2-one, 4-hydroxymethyl-1,3-dioxolane-2-one, 1,3-dioxane-2-one, 4-methyl-1,3-dioxane-2-one, 4,6-dimethyl-1,3-dioxane-2-one, 1,3-dioxopane-2-one; a polyvalent metal compound such as a hydroxide or chloride of zinc, calcium, magnesium, aluminum, iron, zirconium; or the like.

Among these surface cross-linking agents, when a surface cross-linking reaction requires substantially high temperature of equal to or higher than 160° C., in view of enabling to take sufficient time for pretreatment, a high temperature reaction-type surface cross-linking agent is preferable. On the other hand, the case of a low temperature reaction-type surface cross-linking agent may complete a reaction before or during homogenization of the surface cross-linking agent is performed, depending on surface cross-linking treatment temperature in the surface cross-linking step, and thus is not preferable.

The high temperature reaction-type surface cross-linking agent is not especially limited, however, for example, one or more kinds of (a polyhydric alcohol, an oxazolidinone compound, an oxetane compound, an alkylene carbonate compound and a cyclic urea compound) is included. Among these, a polyhydric alcohol and an oxetane compound are preferably used, and at least one kind selected from among a polyhydric alcohol with a carbon atom of 2 to 10, and an oxetane compound with a carbon atom of 2 to 10 is more preferable. A polyhydric alcohol with a carbon atom of 3 to 8 is particularly preferable.

Use amount of the above-described surface cross-linking agent depends on the compound to be used or combinations thereof, however, use amount in a range of from 0.001 part by weight to 10 parts by weight is preferable, and in a range of from 0.01 part by weight to 5 parts by weight is more preferable, relative to 100 parts by weight of the base polymer. By using the surface cross-linking agent in this range, cross-link density of the neighborhood of the surface of the base polymer can be made higher than that of the inside. The case where the use amount of the surface cross-linking agent exceeds 10 parts by weight is not only uneconomical but also makes excessive supply of the cross-linking agent for forming an optimal cross-link structure to the base polymer, and is thus not preferable. The case where the use amount of the surface cross-linking agent is below 0.001 part by weight does not provide sufficient improvement effect in enhancing performance such as absorbency against pressure (AAP) or the like of the base polymer, and is thus not preferable.

In the present invention, the surface cross-linking agent is mixed with and dissolved in a suitable solvent to provide the surface cross-linking agent solution. Here, the solvent is not especially limited, however, water or a hydrophilic organic solvent or the like is preferably used. As the hydrophilic organic solvent, for example, lower alcohols such as methyl alcohol, ethyl alcohol, n-propyl alcohol, isopropyl alcohol, n-butyl alcohol, isobutyl alcohol, t-butyl alcohol; ketones such as acetone; ethers such as dioxane, tetrahydrofuran; amides such as N,N-dimethylformamide; sulfoxides such as dimethylsulfoxide; and the like are included. These solvents may be used alone or two or more kinds may be used in combination. Water or a mixed solution of water and the hydrophilic organic solvent is preferable.

Amount of the solvent to be used in the present invention is not especially limited, and may be selected as appropriate depending on moisture content or particle diameter of the base polymer, or kind or amount of the surface cross-linking agent. For example, use amount of the hydrophilic organic solvent is preferably 0.1 to 10 parts by weight, and more preferably 0.5 to 5 parts by weight relative to 100 parts by weight of the base polymer. In particular, when water is used as the solvent, the amount of water to be used is preferably 0.5 to 20 parts by weight, and more preferably 1 to 10 parts by weight relative to 100 parts by weight of the base polymer. In addition, when water and the hydrophilic organic solvent are used in combination, use amount of water is as described above, and in addition, use amount of the hydrophilic organic solvent to be used in combination is also as described above. In addition, in mixing the cross-linking agent solution to the base polymer, water-insoluble fine particle powder substance or a surfactant may be present together in a range not to obstruct effect of the present invention, for example, 0.001 to 10% by weight, preferably 0.002 to 5% by weight, and more preferably 0.003 to 1% by weight.

These surface cross-linking agents may be used alone or, in consideration of reactivity, two or more kinds may be used in combination. It should be noted that, the surface cross-linking step may be performed multiple times in consideration of effect thereof, and in that case, the same surface cross-linking agent used in the first time may be used, or different surface cross-linking agent may be used. Further, when a plurality of the surface cross-linking agents or the surface cross-linking agents and the solution are used, they may be mixed as a whole at one time, or may be mixed by dividing to multiple stages, however, it is preferable to be mixed to the base polymer as a whole at one time.

It should be noted that, in the present invention, in addition to the surface cross-linking agent, other components may be added. As the other components, a surfactant, an organic acid (lactic acid, citric acid, p-toluenesulfonic acid) or a salt thereof, an acid substance of an inorganic acid (phosphoric acid, sulfuric acid, sulfurous acid) or a salt thereof, a basic substance such as sodium hydroxide or sodium carbonate or the like, a polyvalent metal salt such as aluminum sulfate or the like, are included. Amount of the other components is 0 to 10% by weight, further preferably 0 to 5% by weight, and particularly preferably about 0 to 1% by weight, relative to the water-absorbing resin.

In addition, in the surface cross-linking agent in the present invention, the methods disclosed in the following Patent Documents are applied suitably. That is, a method for surface cross-linking with a monomer containing a cross-linking agent (JP No. 2530668), a method for surface cross-linking with a radical initiator (JP-A-63-99211), a method for surface cross-linking with a radical initiator and a monomer (US-A-2005/0048221) or the like, may suitably be used.

(b) The Humidifying and Mixing Step

The humidifying and mixing step in the present invention is a step for mixing the base polymer obtained by the above production method, and the surface cross-linking agent solution to obtain the "humidified substance". That is, in the present invention, the "humidified substance" indicates a mixture of the base polymer and the surface cross-linking agent solution.

A mixing apparatus to be used for mixing the base polymer and the surface cross-linking agent solution is not especially limited, however, it is preferable to have large mixing force to uniformly and surely mix these. As the mixing apparatus, for example, a cylinder-type mixing machine, a double wall cone-type mixing machine, a high speed stirring-type mixing machine, a V-character-type mixing machine, a ribbon-type mixing machine, a screw-type mixing machine, a twin arm-type kneader, a pulverizing-type kneader, a rotation-type mixing machine, an air flow-type mixing machine, Turbulizer, a continuous-type Rhedige mixer, a continuous-type Pro-shear mixer or the like can be used suitably.

It is preferable that these mixing apparatuses are heated by passing heat medium through a jacket and/or a rotation axis to prevent adhesion of a polymer to the apparatus. That is, it is also one of the preferable embodiments that by taking suitable residence time in a humidifying and mixing apparatus heated, one apparatus has roles of both the humidifying and mixing step and the pretreatment step (the humidifying and mixing step and the pretreatment step are performed in one apparatus). Temperature of the base polymer to be supplied to the humidifying and mixing step is usually 20 to 90° C., preferably 30 to 85° C., more preferably 40 to 80° C. and still more preferably 50 to 70° C. The temperature of the base polymer of over 90° C. tends to make uniform mixing difficult, while the temperature of the base polymer of below 20° C. tends to increase aggregation of the humidified substance.

In the present invention, moisture content of the humidified substance, obtained by mixing the base polymer and the surface cross-linking agent solution, is usually 1 to 20% by weight, and preferably 2 to 15% by weight. Within such a moisture content, sufficient surface cross-linking is performed at the (d) surface cross-linking reaction step to be performed later, and desired property (for example, AAP or SFC) can be enhanced.

In addition, other than the above methods, for example, the surface cross-linking agent solution may be sprayed with a sprayer or the like, or dropped (preferably sprayed) to the base polymer. In this case, size of a droplet to be sprayed is preferably within a range of 0.1 to 300 μm, and more preferably within a range of 0.1 to 200 μm, as average particle diameter.

(c) The Pretreatment Step

The pretreatment step in the present invention is a step for raising temperature of the humidified substance obtained in the humidifying and mixing step from temperature below dew point up to the temperature 10° C. higher than the dew point.

Therefore, irrespective of whether an apparatus for performing the pretreatment step and an apparatus for performing the subsequent surface cross-linking reaction step are the same or different, a period for raising temperature of the humidified substance from temperature below dew point up to the temperature 10° C. higher than the dew point can be said the pretreatment step.

It should be noted that, in the description of the present application, "dew point" means dew point of a space part in a reactor (a pretreatment apparatus) for pretreatment, however, practically dew point inside an exhaustion tube of said pretreatment apparatus is defined as "dew point".

In addition, expression that "temperature of the humidified substance is raised from temperature below dew point up to the temperature 10° C. higher than the dew point" means that temperature of the humidified substance before charging the humidified substance to the pretreatment apparatus is a temperature of below dew point, and temperature of the humidified substance is raised so that temperature of the humidified substance becomes the temperature 10° C. higher than the dew point.

Further, the "pretreated substance" indicates a mixture of the base polymer and the surface cross-linking agent (humidified substance) which has been heated up to the temperature 10° C. higher than the dew point.

According to the present invention, by conducting the pretreatment step under specified condition, between the humidifying and mixing step and the surface cross-linking reaction step (the heat treatment step), even when the humidified substance with high moisture content is surface cross-linked, property (in particular, AAP or SFC) of the resultant water-absorbing resin can be enhanced. Mechanism for enhancement of property of the resultant water-absorbing resin in this way is guessed as follows. It should be noted that, the present invention is not limited to the following guess. That is, in said pretreatment step, by raising temperature of the humidified substance from temperature below dew point up to the temperature 10° C. higher than the dew point, evaporation of the solvent of the surface cross-linking agent solution from the humidified substance can be controlled so that the surface cross-linking agent is present selectively at the surface of the humidified substance. Therefore, according to the method of the present invention, because the surface cross-linking treatment (heat treatment) with the surface cross-linking agent is performed giving priority at the neighborhood of the surface of the humidified substance, it becomes possible that the resultant water-absorbing resin has a good surface cross-linked state. It should be noted that, the "neighborhood of the surface" indicates a part of the surface layer with a thickness of usually equal to or less than several tens μm, or a part of the surface layer with a thickness of equal to or less than 1/10 of total thickness, however, this thickness is determined as appropriate depending on objectives. The water-absorbing resin relevant to the present invention can enhance absorbency against pressure (AAP), in other words, absorption ability against pressure, and saline flow conductivity (SFC), that is, liquid permeability in swelling, by being surface cross-linked at the neighborhood of the surface thereof. In more detail, "surface cross-linking" in the present application means that a region of the surface or the neighborhood of the surface of the humidified substance has been surface cross-linked by chemical or physical modification. For example, in the case of partially neutralized cross-linked polyacrylic acid, as an example, chemical modification means a state that the surface cross-linking was performed with the organic surface cross-linking agent having two or more functional groups being able to react with a functional group, in particular, a carboxyl group, present at the neighborhood of the surface of the particles, for example, a polyhydric alcohol, a polyvalent glycidyl compound, a polyvalent amine or the like. Other than this, surface cross-linking by an ionic bond of a surface carboxyl group by a polyvalent metal, for example, trivalent aluminum is also included. The bonding form in the surface cross-linking is not especially limited.

As the treatment apparatus, Rhedige mixer having a heating mechanism, a Pro-shear mixer, a kneader, a conductive heat transfer-type stirring dryer (for example, a paddle dryer manufactured by Nara Machinery Co., Ltd., or the like), a fluid-bed dryer, a fluid-bed dryer equipped with a heat transfer tube, a mortar mixer or the like is included. They are preferably continuous-type apparatuses. It is preferable that these apparatuses have a mechanism for controlling dew point. Specifically, it is a mechanism for supplying air and/or inert gas quantitatively to purge steam or the like generating by heating, and a mechanism for discharging exhaust gas. In addition, as needed, it is preferable that a steam charging line is installed for adjusting dew point. When a volatile organic solvent is used for the surface cross-linking agent solution, and when supply of air and/or inert gas in a large amount is necessary to remove an organic solvent generating in the pretreatment step, outside the system, charging of steam may be required to maintain dew point.

An energetically advantageous method to adjust to the predetermined dew point is to utilize steam generated when the humidified substance is heated. Therefore, when moisture content of the humidified substance is high, because amount of steam generated when the humidified substance is heated increases, dew point tends to be increased easily and is thus preferable.

It is considered that the surface cross-linking agent solution is adhered heterogeneously at the particle surface of the humidified substance obtained by mixing the base polymer and the surface cross-linking agent aqueous solution. When the surface cross-linking reaction is performed in this state as it is, it results in being present together parts with and without the secondary cross-linking at the particle surface. It is desirable that homogenization is attained by diffusion at the neighborhood of the particle surface before the surface cross-linking agent and the polymer are reacted, and the pretreatment step referred to in the present application is a step for performing this homogenization.

By setting the pretreatment step under atmosphere with specified dew point, material temperature is raised while adjusting a water-containing state of the humidified substance to some extent, and in this way to perform promotion of diffusion of the surface cross-linking agent. It contributes to not only increase dew point by partial evaporation of water by heating, but also increase solid content of the humidified substance. It is speculated that, in this case, when moisture content of the base polymer is high, water migration from inside the particle to the surface side of the particle in the present pretreatment step also contributes to uniform arrangement of the surface cross-linking agent at the particle surface.

In the present pretreatment step, one having a stirring mechanism is used preferably. Stirring promotes stirring of a material and heat transfer, resulting in easy temperature increase, as well as helping in crushing the aggregated substance generating partially. Further, it is speculated that the surface cross-linking agent present at the particle surface is transcribed by repeated contact with other particles, and it contributes to uniform arrangement of the surface cross-linking agent at the particle surface. Because such effect is not exerted by too slow stirring, a peripheral speed of a stirring blade end is preferably equal to or higher than 10 m/minute, more preferably equal to or higher than 20 m/minute, and most preferably equal to or higher than 30 m/minute. Here, the upper limit of the peripheral speed of the stirring blade end is not especially limited, however, usually 1000 m/minute and preferably 500 m/minute.

In the present pretreatment step, it is necessary to obtain the "pretreated substance" by raising temperature of the humidified substance from temperature below dew point up to the temperature of 10° C. higher than the dew point. For example, when dew point is 70° C., and temperature of the humidified substance is 50° C., it is necessary to raise temperature by heating till 70° C.+10° C.=80° C. is attained.

Temperature of the humidified substance relevant to the embodiment of the present application, in said pretreatment step, is raised essentially from temperature below dew point up to the temperature of 10° C. higher than the dew point, and more preferably up to the temperature 20° C. higher than the dew point.

In addition, dew point is essentially 50 to 95° C. and preferably 60 to 90° C. The dew point out of this range requires a large amount of energy, and is thus not preferable.

In the pretreatment step, temperature of the humidified substance is raised from temperature below dew point up to the temperature of 10° C. higher than the dew point, and in more specifically, it is preferable that temperature of the humidified substance is raised from temperature below dew point by 1 to 40° C. up to higher temperature than dew point by 10 to 180° C., and more preferably, temperature of the humidified substance is raised from temperature below dew point by 1 to 20° C. up to higher temperature than dew point by 10 to 150° C.

Time required in the present pretreatment step is not especially limited, however, usually from 10 seconds to 10 minutes is preferable, and from 20 seconds to 5 minutes is more preferable.

It should be noted that, measurement of dew point can be performed by inserting a dew point meter inside the pretreatment step. When the stirring blade becomes an obstacle, the dew point meter may be inserted inside the part of the exhaustion tube.

(d) The Surface Cross-Linking Reaction Step

The surface cross-linking reaction step in the present invention is usually a heat treatment step and is a step for further raising temperature of the pretreated substance obtained at the pretreatment step, maintaining it preferably at 150 to 250° C., more preferably at 170 to 230° C., and performing a cross-linking reaction, in particular, a dehydrating cross-linking reaction, between a functional group (in particular, a carboxyl group) of the water-absorbing resin and the surface cross-linking agent, to obtain the surface cross-linked "water-absorbing resin".

As a surface cross-linking apparatus to be used in the present step, a usual dryer or a heating furnace is used. For example, a dryer or a heating furnace of a conductive heat transfer-type dryer, a radiation heat transfer-type dryer, a hot air heat transfer-type dryer, an inductive heating-type dryer is suitable. In more specifically, a groove-type dryer, a rotary dryer, a disk dryer, a fluid bed dryer, an air flow-type dryer, and an infrared ray dryer is exemplified. Among these, a groove-type dryer, particularly a conductive heat transfer-type stirring dryer (for example, a paddle dryer, manufactured by Nara Machinery Co., Ltd.), a fluid bed dryer, particularly a heat-transfer tube combination-type fluid bed dryer (a conduction flow dryer, manufactured by OKAWARA MFG. CO., LTD), or a fluid bed dryer (Pulbis-GB22, manufactured by Yamato Scientific Co., Ltd.) is preferably used. In addition, in consideration of uniform surface treatment, it is preferable that the surface cross-linking apparatus has a rotation axis, and a heat treatment apparatus having a rotation axis is used particularly preferably.

Condition of the surface cross-linking reaction in the present step is not especially limited, and differs depending on kind, amount or the like of the pretreated substance, the surface cross-linking agent, and the solvent. For example, temperature and time required in the surface cross-linking reaction depend on reactivity of the surface cross-linking agent, however, the pretreated substance is usually surface cross-linked at a temperature of 90 to 250° C., more preferably 120 to 200° C., for 10 to 100 minutes, more preferably 20 to 60 minutes. In particular, in the case of the high temperature reaction-type surface cross-linking agent, it is preferable to perform the surface cross-linking reaction, usually at 150 to 250° C. for about 10 minutes to 120 minutes.

In the present invention, the humidifying and mixing step, the pretreatment step and the surface cross-linking reaction step may be performed with each separate apparatus, however, one or more steps of these steps may be performed with one apparatus. For example, the humidifying and mixing step and the pretreatment step may be performed with one apparatus, or the pretreatment step and the surface cross-linking reaction step may be performed with one apparatus, or three steps of the humidifying and mixing step, the pretreatment step and the surface cross-linking reaction step may be performed with one apparatus. In addition, the three steps may be performed continuously by using two apparatuses. In this case, the front half part and the rear half part inside one apparatus are used as different role, that is, different step.

In addition, when the pretreatment step and the surface cross-linking reaction step are performed with one apparatus (preferably a heat treatment apparatus), the pretreatment step and the surface cross-linking reaction step have at least a first zone and a second zone. The first zone may be a zone having a dew point of from 50° C. to 95° C., which comprises raising temperature of the humidified substance from a temperature below the dew point up to the temperature of 10° C. higher than the dew point to obtain the "pretreated substance". The first zone corresponds to the pretreatment step relevant to the present invention. In addition, the second zone is a zone which comprises further raising temperature of the pretreated substance to react the pretreated substance with the surface cross-linking agent; and in the second zone, the reaction between the pretreated substance and the surface cross-linking agent is kept at a temperature of from 150° C. to 250° C. to obtain the surface cross-linked "water-absorbing resin". In this way, stability of property (in particular, AAP or SFC) of the water-absorbing resin can be enhanced still more. In addition, such a water-absorbing resin superior in property stability can be produced efficiently, while ensuring lower cost and high productivity.

It should be noted that, time for the pretreatment step and the surface cross-linking reaction step is not especially limited, and may be determined as appropriate based on property of the resultant water-absorbing resin, however, 1 to 120 minutes for each is preferable, and 5 to 50 minutes for each is more preferable.

In addition, the water-absorbing resin which was surface cross-linked as above-described may be cooled as needed, after the surface cross-linking reaction step. A cooling apparatus to be used in this cooling step is not especially limited, however, a cooling machine has been exemplified in U.S. Pat. No. 6,378,453 and the like, and for example, a twin-screw stirring dryer or the like may be used, where cooling water at equal to or lower than 50° C., and preferably 20° C. to 35° C. is passed through inside of the inner wall or other heat transfer surfaces. In addition, it is preferable that the water-absorbing resin is cooled down to 50 to 70° C. in the cooling step. It should be noted that, there may be the case where the surface cross-linking reaction step is performed at room temperature, and in this case, because the surface cross-linked water-absorbing resin is not heated, this cooling step may not be performed.

Figure 2:
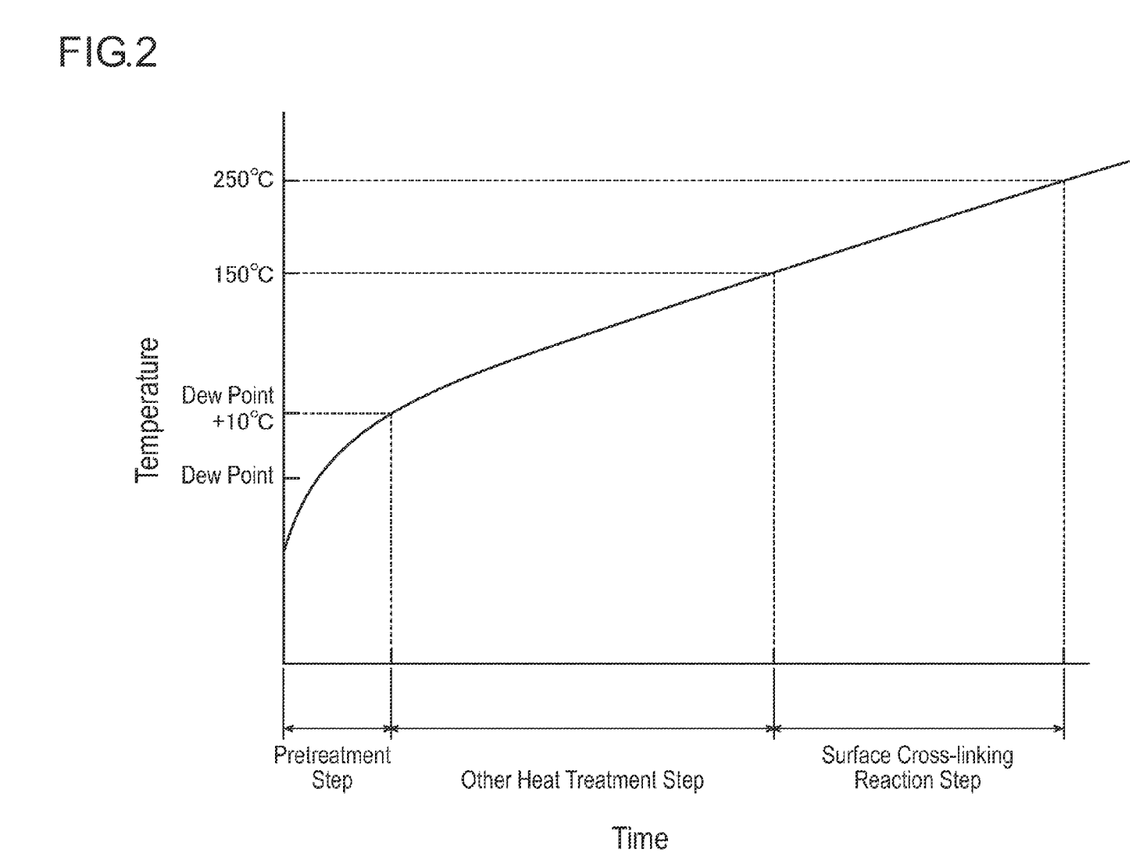
FIG. 2 is a drawing for explaining one preferable aspect of the method of the present invention

As described above, the method of the present invention may be enough to have essentially the pretreatment step for raising temperature of the humidified substance obtained in the humidifying and mixing step from temperature below dew point up to the temperature 10° C. higher than the dew point and the surface cross-linking reaction step for obtaining the surface cross-linked "water-absorbing resin" by further raising temperature of the pretreated substance obtained in the pretreatment step and thereafter maintaining it at 150° C. to 250° C. Therefore, the relevant pretreatment step and the surface cross-linking reaction step may be performed continuously, or another step or other steps may be introduced between the relevant pretreatment step and the surface cross-linking reaction step. Here, the case where another step or other steps may be introduced between the relevant pretreatment step and the surface cross-linking reaction step may include the case, for example, where temperature of the humidified substance is below the temperature 10° C. higher than the dew point, at the time of completion of the pretreatment step. Explanation will be given below specifically on the relevant embodiment with reference to FIG. 2. It should be noted that, the following explanation aims at explaining the present invention in more detail, and thus the present invention should not be limited to the following explanation. As shown in FIG. 2, in the method of the present invention, in the pretreatment step, the "pretreated substance" is obtained by raising temperature of the humidified substance from temperature below dew point up to the temperature 10° C. higher than the dew point. Next, in other heat treatment step, the "heat treated substance" is obtained by raising temperature of the pretreated substance up to the predetermined initiation temperature of the surface cross-linking reaction (150 to 250° C.). Still more, in the surface cross-linking reaction step, the surface cross-linked "water-absorbing resin" is obtained by making the heat treated substance and the surface cross-linking agent reacted. It should be noted that, although the surface cross-linking reaction is performed by gradually raising reaction temperature in FIG. 2, the present invention is not limited to said embodiment, and a reaction between the heat treated substance and the surface cross-linking agent may be performed by maintaining at constant temperature within 150 to 250° C. In addition, in the present description, when another step or other steps may be introduced between the relevant pretreatment step and the surface cross-linking reaction step, another step or other steps between the both steps may also be referred to as "other heat treatment step".

(e) Further Preferable Steps

In order to exert effect of the present invention more, it is preferable that the humidifying and mixing step, the pretreatment step and the surface cross-linking reaction step are continuously performed. By being continuously performed, the water-absorbing resin with objective property can be obtained more stably.

In addition, transportation between each of the steps is preferably performed in a short period, more preferably within 5 minutes, still more preferably within 1 minute, and particularly preferably within 0.2 minute. To attain this condition, apparatuses to be used in each of the steps are connected directly with a pipeline or the like.

In addition, in the present invention, supply amount to the humidifying and mixing step, the pretreatment step and the surface cross-linking reaction step is not especially limited, however, equal to or higher than 10 kg/hr is preferable, equal to or higher than 100 kg/hr is more preferable, and equal to or higher than 1 t/hr is particularly preferable. By adopting this supply amount, effect is exerted by continuous production.

In addition, in surface treatment of the present invention, pressure of each step is not especially limited, and any of pressurization, normal pressure and reduced pressure may be adopted, however, it is preferable that, in view of exerting effect of the present invention more, one or more steps, still more two or more steps selected from among the humidifying and mixing step, the pretreatment step and the surface cross-linking reaction step, and particularly all the steps are in a reduced pressure state, or more preferably in a slightly reduced pressure state. Said degree of reduced pressure is not especially limited, however, it is preferable that degree of reduced pressure in the step in a reduced pressure state, relative to atmospheric pressure, is a slightly reduced pressure state, for example, over 0 kPa and equal to or lower than 10 kPa. By making the degree of reduced pressure inside the step in the above range, not only the water-absorbing resin with objective property can be obtained stably but also effect such as property enhancement of the resultant water-absorbing resin, decrease in amount of the fine powders, enhancement of blocking resistance or the like can be exerted.

In the present invention, when each of the steps is performed under reduced pressure, a depressurization apparatus is not especially limited, as long as it is capable of attaining a reduced pressure state. The relevant depressurization apparatus may be an exhaustion apparatus for performing simply exhaustion, or a suction exhaustion apparatus for making vapor suctioned passed through a filter, and then exhausting this vapor. By this exhaustion, moisture inside the step can be removed effectively.

In the present invention, the "reduced pressure state" indicates a state that pressure is lower than atmospheric pressure. In addition, "the degree of reduced pressure relative to atmospheric pressure" means pressure difference from atmospheric pressure, and when pressure is lower than atmospheric pressure, it is expressed as positive (plus) value. For example, when atmospheric pressure is standard atmospheric pressure (101.3 kPa), "the degree of reduced pressure of 10 kPa" means that gas pressure is 91.3 kPa.

In addition, in the description of the present application, the "degree of reduced pressure relative to atmospheric pressure" may also be referred to simply as the "degree of reduced pressure".

In the present invention, the lower limit of the degree of reduced pressure is, in view of enhancing the above effect derived from reduced pressure, preferably over 0 kPa, more preferably equal to or higher than 0.01 kPa, and still more preferably equal to or higher than 0.05 kPa. In addition, the upper limit of the degree of reduced pressure is, in view of preventing floating up of the fine powders inside each of the steps, and suppressing cost of the exhaustion apparatus, preferably equal to or lower than 10 kPa, more preferably equal to or lower than 8 kPa, still more preferably equal to or lower than 5 kPa, and particularly preferably equal to or lower than 2 kPa. It should be noted that preferable range of numerical value of the degree of reduced pressure may be selected arbitrary between the lower limit value and the upper limit value.

(f) The Surface Treated Water-Absorbing Resin

In the water-absorbing resin surface treated by the method of the present invention, a surface cross-linked structure is formed uniformly at the surface of the base polymer. Therefore, the water-absorbing resin surface treated by the method of the present invention is capable of enhancing various properties, in particular, absorbency against pressure (AAP) for a normal saline solution under a load of 4.8 kPa, and saline flow conductivity (SFC). Therefore, the present invention also provides the production method for the water-absorbing resin, including the surface treatment method of the present invention.

Absorbency against pressure (AAP), for a normal saline solution under a load of 4.8 kPa, of the water-absorbing resin relevant to the present invention, is preferably equal to or higher than 23.5 g/g. The absorbing products such as disposable diapers, where such a water-absorbing agent is used, absorb body fluid or the like well. AAP of the water-absorbing resin relevant to the present invention is more preferably equal to or higher than 24.0 g/g, and still more preferably equal to or higher than 24.5 g/g. It should be noted that, because the higher is the absorbency against pressure, the absorbing products are capable of obtaining the higher property, the upper limit thereof is not especially limited, however, in view of becoming difficult to produce and increasing cost, the upper limit of absorbency against pressure is considered to be about 40.0 g/g. This absorbency against pressure, for a normal saline solution under a load of 4.8 kPa, is referred to in the present application as AAP (4.8 kPa) or simply AAP as well. It should be noted that, "absorbency against pressure, for a normal saline solution under a load of 4.8 kPa" is a value measure according to a method described in the following Example.

In addition, saline flow conductivity (SFC) of the water-absorbing resin relevant to the present invention is preferably equal to or higher than 45 $(\times 10^{-7} \cdot cm^3 \cdot s \cdot g^{-1})$. It should be noted that, "saline flow conductivity (SFC)" is a value showing liquid permeability of the water-absorbing resin in swelling. This saline flow conductivity may be referred to as liquid permeation. The higher is the value of this saline flow conductivity (SFC), the water-absorbing resin shows to have the higher liquid permeability. The absorbing products such as disposable diapers, where the water-absorbing agent relevant to the present invention is used, absorb body fluid or the like well. SFC is preferably equal to or higher than 50 $(\times 10^{-7} \cdot cm^3 \cdot s \cdot g^{-1})$, and still more preferably equal to or higher than 55 $(\times 10^{-7} \cdot cm^3 \cdot s \cdot g^{-1})$. In absorbing products containing such a water-absorbing resin, even when concentration of the water-absorbing resin contained in the absorbing products is equal to or higher than 30% by mass, in more specifically equal to or higher than 50% by mass, absorption speed of urine is maintained suitably and generation of leakage is also suppressed. It should be noted that "saline flow conductivity (SFC)" is a value measure according to a method described in the following.

Conventionally, in order to enhance AAP or SFC more than a certain level, excessive surface cross-linking was necessary. Therefore, the absorbency against non-pressure (GV) considerably decreased so that a water-absorbing resin with high property could not be obtained. However, by adopting the surface treatment method disclosed in the present description, the water-absorbing resin with high AAP/high SFC, such as the AAP of equal to or higher than 23.5 g/g and/or the SFC of equal to or higher than 45 ($\times 10^{-7} \cdot cm^3 \cdot s \cdot g^{-1}$), can be obtained, and thus the present method is suitably applied to produce such a water-absorbing resin.

EXAMPLES

The present invention will be explained more specifically below with reference to Production Examples, Examples, and Comparative Examples, however, the present invention should not be construed restrictive thereto. Examples obtained by suitably combining technological means each disclosed in different examples are also encompassed in a range of the present invention.

It should be noted that, an electric appliance to be used in Examples was used always in 200 V or 100 V, unless otherwise specified. Further, the water-absorbing resin was used under condition of 25±2° C. and a relative humidity of 50% RH, unless otherwise specified. Reagents or devices exemplified in the following measurement methods or Production Examples, Examples and Comparative Examples may be substituted with equivalent products as appropriate.

In addition, the humidifying and mixing step, the pretreatment step and the surface cross-linking reaction step shown in the following Examples and Comparative Examples were performed substantially continuously within 1 minute as time for each step, and surface treatment was performed in a slightly reduced pressure state (degree of reduced pressure of 0.01 to 2 kPa).

[A Measurement Method for Property]
<Absorbency Against Non-Pressure (GV)>

0.2 g of the water-absorbing resin was put uniformly in a bag made of nonwoven fabric (60 mm×60 mm) This bag is immersed in a 0.9% by weight sodium chloride aqueous solution (normal saline solution). After 30 minutes, the bag was pulled up, and drained water for 3 minutes using a centrifugal separation apparatus under a condition 250×9.81 m/s² (250 G), and after that, mass $W_1$ (g) of the bag was measured. On the other hand, similar operation was performed without using the water-absorbing resin, and mass $W_0$ (g) at that time was measured. GV (absorbency against non-pressure) was calculated in accordance with the following expression.

$$GV(g/g) = ((W_1 - W_0)/\text{mass of the water-absorbing resin}) - 1 \quad \text{[Mathematical Formula 1]}$$

<Absorbency Against Pressure (AAP)>

A load was prepared, which was adjusted to attain a pressure of 4.83 kPa (0.7 Psi). And on a metal mesh of a plastic cylinder having a diameter of 60 mm, adhered with the metal mesh of a 400 mesh (sieve mesh size of 38 μm) at the bottom, 0.90 g of the water-absorbing resin was spread uniformly. The load was mounted thereon, and mass $W_2$ (g) of the whole set of this measurement apparatus was measured.

Next, at the inside of a Petri dish with a diameter of 150 mm, a glass filter with a diameter of 90 mm (a fine pore diameter of 100 to 120 μm; manufactured by SOGO LABORATORY GLASS WORKS CO., LTD) was put, and a 0.90% by weight of sodium chloride aqueous solution (20 to 25° C.) was added, so as to attain the same level as the upper surface of the glass filter.

One sheet of a filter paper with a diameter of 90 mm (trade name: "JIS P 3801 No. 2", manufactured by ADVANTEC TOYO Co., Ltd.; a thickness of 0.26 mm, and a retention particle diameter of 5 μm) was put thereon, the whole surface thereof was wetted, and excess solution was removed.

The whole set of the above measurement apparatus was mounted of the above wetted filter paper, to absorb the liquid under a load. After 1 hour (60 minutes), the whole set of the measurement apparatus was lifted up to measure mass thereof $W_3$ (g). In this way, absorbency against pressure (g/g) was calculated from these masses $W_2$ and $W_3$, according to the following expression.

$$\text{Absorbency against pressure (g/g)} = (W_3 - W_2)/\text{mass of the water-absorbing resin (g)} \quad \text{[Mathematical Formula 2]}$$

It should be noted that, reason for using absorbency against pressure under a pressure (under a load) of 4.83 kPa (0.7 Psi) was that such a state was assumed that the absorbing products such as absorbing bodies or disposable diapers and the like are used by an infant in a sleeping state and in a sitting state.

<Saline Flow Conductivity (SFC)>

Saline flow conductivity (SFC) was measured in accordance with the saline flow conductivity (SFC) test described in US-A-2004-0106745 and JP-A-9-509591.

Specifically, 0.90 g of the water-absorbing resin put uniformly in a cell was swollen for 60 minutes in artificial urine, under pressurization of 0.3 psi (2.07 kPa), to record height of the gel layer. Then under pressurization of 0.3 psi (2.07 kPa), 0.69% by weight sodium chloride aqueous solution was passed through the swollen gel layer, from a tank under a constant hydrostatic pressure.

In the tank, a glass tube is inserted. The glass tube is arranged with the lower end position adjusted so that liquid surface of the 0.69% by weight sodium chloride aqueous solution in the cell is maintained at a height of 5 cm above the bottom part of the swollen gel. The 0.6% by weight sodium chloride aqueous solution in the tank was supplied to the cell through an L-character tube equipped with a cock. Under the cell, a trapping container for trapping liquid passed through is arranged, and the trapping container is installed on an even balance. Inner diameter of the cell is 6 cm, and at the bottom surface of the lower part, a No. 400 metal mesh made of stainless steel (a sieve mesh size of 38 μm) is installed. At the lower part of the piston, there is a hole sufficient for the liquid to pass through, and at the bottom part, a glass filter with good permeability is attached, so as to prevent intrusion of the particulate water-absorbing resin or swollen gel thereof into the hole. The cell is put on a stand for mounting the cell, and this stand is installed on the metal mesh made of stainless steel, so as to prevent liquid permeation.

As the above artificial urine, one obtained by mixing 0.25 g of a dihydrate of calcium chloride, 2.0 g of potassium chloride, 0.50 g of a hepta-hydrate of magnesium chloride, 2.0 g of sodium sulfate, 0.85 g of ammonium dihydrogen phosphate, 0.15 g of diammonium hydrogen phosphate, and 994.25 g of pure water was used.

It should be noted that, the SFC test was performed at room temperature (20 to 25° C.). Using a computer and a balance, fluid amount passing through the gel layer is recorded for 10 minutes in an interval of 20 seconds as a function of time. Flow velocity Fs (T) for the swollen gel (mainly between particles) to pass through was calculated by dividing increased mass (g) by increased time (s) in a unit of g/s. Time, when hydrostatic pressure became constant and stable flow velocity was obtained, was adopted as ts, and using flow velocity obtained for 10 minutes from ts, value of Fs (t=0), that is, initial flow velocity for passing through the gel layer, was calculated. Fs (t) is plotted against time, Fs (t=0) was calculated by extrapolation to t=0 of result of the least square method of Fs (t) plot against time. Then saline flow conductivity SFC (liquid permeation rate against pressure) was calculated using the following expression. It should be noted that, unit of liquid permeation rate against pressure is ($10^{-7} \times cm^3 \times s \times g^{-1}$).

Liquid permeation rate against pressure
($10^{-7} \times cm^3 \times s \times g^{-1}$)=
$Fs(t=0) \times L_0/(\rho \times A \times \Delta P)$, wherein    [Mathematical Formula 3]

Fs (t=0): Flow rate expressed in g/s
$L_0$: Height of the gel layer expressed in cm
$\rho$: Density of the NaCl solution (1.003 g/cm$^3$)
A: Area of the upper side of the gel layer in the cell (28.27 cm$^2$)
$\Delta P$: Hydrostatic pressure loaded on the gel layer (4920 dyne/cm$^2$)

Production Example 1

By supplying the following solutions continuously to a mixer by setting so as to attain a flow volume of 9.7 g/s for a 48.5% by weight sodium hydroxide aqueous solution, 12.1 g/s for acrylic acid, 0.0529 g/s for mixed solution of a 30% by weight of aqueous solution of polyethylene glycol diacrylate (an average molecular weight of 522)(a flow volume of 0.0513 g/s) and a 46% by weight aqueous solution of diethylene triamine pentaacetic acid trisodium salt (a flow volume of 0.0016 g/s), and 5.286 g/s for water, a aqueous monomer solution was adjusted. In this case, temperature of the aqueous monomer solution was 103° C.

Into this adjusted aqueous monomer solution, still more 1.0% by weight sodium persulfate aqueous solution was added in a flow volume of 0.589 g/s, and then the aqueous monomer solution was supplied continuously onto an endless belt which was retained heat at about 100° C., and running in a speed of 230 cm/minute. The aqueous monomer solution supplied continuously onto the belt quickly initiated polymerization to provide a belt-like water-containing gel sheet.

This water-containing gel sheet was crushed (segmetalized) continuously using a cutter mill having a screen with a hole diameter of 8 mm (trade name: "U-280", manufactured by HORAI Co, Ltd). Then polymer gel with a temperature of about 35° C., and a size of about 2 to 5 mm (a particulate water-containing cross-linked polymer) was obtained. In this case, moisture content of the polymer gel was 29% by weight.

The resultant polymer gel was charged in an amount of 74 kg/h continuously to a conduction flow dryer (trade name: "FCA-2", manufactured by OKAWARA MFG. CO., LTD.; a length of a fluidized bed of 850 mm, and a width of the fluidized bed of 240 mm), which was set at a hot air temperature of 180° C. and air rate of 2.4 m/sec, to perform drying. It should be noted that, inside of the fluidized bed was partitioned nearly equally into 4 (four) in a length direction with a three pieces of partition boards to attain a 4 (four) rooms configuration. Height of the fluidized bed during drying was about 300 mm, and moisture content was 10.5% by weight, which was measured by sampling a dried substance exhausted from an exit of the dryer, when temperature inside the bed was stabilized after 55 minutes from starting of drying.

The dried substance was pulverized and classified to obtain a base polymer (B1) having a major size of 150 μm to 710 μm, a weight average particle diameter (D50) of 370 μm, and a moisture content of 10% by weight.

Example 1

[The Humidifying and Mixing Step]

Relative to 100 parts by weight of the base polymer (B1) obtained in Production Example 1, 3.9 parts by mass of a surface cross-linking agent aqueous solution, composed of 1,4-butanediol (hereafter may also be referred to as "1,4-BD"), propylene glycol (hereafter may also be referred to as "PG") and pure water, in an amount of 0.34 parts by mass, 0.56 parts by mass and 3 parts by mass, respectively, was mixed with a high speed continuous stirring mixing machine (Turbulizer, manufactured by Hosokawa Micron Corporation) to obtain a humidified substance. The humidified substance had a temperature of 60° C. and a moisture content of 12.5% by weight.

[The Pretreatment Step]

A pretreated substance (f1) was obtained from an exhaustion port, while continuously charging the humidified substance obtained in the humidifying and mixing step, in 1.7 kg/minute, to the Pro-shear mixer (WA-75, manufactured by Pacific Machinery & Engineering Co., Ltd), whose jacket was heated at about 150° C. by passing through heat medium to the jacket in advance, and by taking a residence time of 3.5 minutes in average.

At a time when an equilibrium state was attained, rotation number of a stirring blade of the Pro-shear mixer was 200 rpm (a peripheral speed of 188 m/minute), dew point in the exhaustion tube of the Pro-shear mixer was 71° C., material temperature at the exit of the Pro-shear mixer was 123° C., and a moisture content of the pretreated substance (f1) was 10% by weight. In the present Example 1, temperature of the humidified substance was raised from 60° C. to 123° C., and period when temperature of the humidified substance was raised up to 70° C.+10° C.=80° C. corresponds to the pretreatment step.

It should be noted that, measurement of dew point was performed with a handy-type multi-functional thermo-hygrometer (rotoronic HYDROPALM2, ROTRONIC AG, Swiss made) using HygroClip HK40 as a sensor.

[The Surface Cross-Linking Reaction Step]

500 g of the pretreated substance (f1) obtained in this way was charged into a fluidized-bed dryer (Pulbis-GB22, manufactured by Yamato Scientific Co., Ltd.), which was maintained heat at a reactor part with a mantle heater at a set temperature of 200° C., and fluidized for 90 minutes in total under a hot air temperature of 180° C., and air flow volume of 0.2 m$^3$/minute, to perform surface cross-linking, and after cooling property measurement of the resultant surface cross-linked water-absorbing resin was performed. Results thereof are shown in the following Table 1.

Comparative Example 1

A pretreated substance (f2) was obtained by performing similar operation as in Example 1, except that jacket temperature of the Pro-shear mixer was set at 60° C., and residence time was set at 6.8 minutes, in the pretreatment step of Example 1. When an equilibrium state was attained, dew point of the Pro-shear mixer was 47° C., material temperature at the exit of the Pro-shear mixer was 60° C., and moisture content of the pretreated substance (f2) was 12% by weight. That is, temperature of the humidified substance was maintained at 60° C. in the present pretreatment step.

The pretreated substance (f2) obtained in this way was subjected to a surface cross-linking reaction similarly as in Example 1, and after cooling, property measurement of the resultant surface cross-linked water-absorbing resin was performed. Results thereof are shown in the following Table 1.

Comparative Example 2

A pretreated substance (f3) was obtained by performing similar operation as in Example 1, except that dew point in the exhaustion tube of the Pro-shear mixer was set at 40° C. by passing air through the Pro-shear mixer, in the humidifying and mixing step, and the pretreatment step of Example 1. When an equilibrium state was attained, material temperature at the exit of the Pro-shear mixer was 113° C., and moisture content of the pretreated substance (f3) was 9% by weight. That is, temperature of the humidified substance was maintained at 60° C. in the present pretreatment step, that is, higher than dew point by 20° C.

The pretreated substance (f3) obtained in this way was subjected to a surface cross-linking reaction similarly as in Example 1, and after cooling, property measurement of the resultant surface cross-linked water-absorbing resin was performed. Results thereof are shown in the following Table 1.

Production Example 2

A aqueous monomer solution containing sodium acrylate, acrylic acid and water, with a monomer concentration of 38% by mole, and a neutralization rate of 75% by mole was prepared, in a kneader equipped with two sigma-type blades, and polyethylene glycol diacrylate (average number of ethylene glycol unit: 9) as an internal cross-linking agent, was dissolved to attain 0.03% by mole (based on the monomer) to prepare the aqueous monomer solution.

Next, dissolved oxygen in the aqueous monomer solution was reduced by blowing nitrogen gas into said aqueous monomer solution, as well as the whole inside of the reactor was purged with nitrogen. Subsequently, while rotating two sigma-type blades, sodium persulfate as a polymerization initiator and L-ascorbic acid were mixed to attain concentration of sodium persulfate/L-ascorbic acid of 0.12 g/mole (based on the monomer)/0.005 g/mole (based on the monomer), respectively, to obtain, after about 40 minutes, polymer gel (a hydrophilic cross-linked polymer) with an average particle diameter of about 2 mm.

When polymer gel obtained was used in the following Example 2 and Comparative Example 3, it was dried with a hot air dryer at 170° C. for 55 minutes. The dried substance was pulverized with a roll mill pulverization machine, and classified with a sieve having a sieve mesh size of 850 μm and 105 μm, to obtain a water-absorbing resin base polymer (B2) having a moisture content of 5% by weight, a weight average particle size of 478 μm, and a weight percent of particles with a particle diameter of below 150 μm of 0.8% by weight.

Example 2

Relative to 100 parts by weight of the base polymer (B2) obtained in Production Example, 3.9 parts by mass of a surface cross-linking agent aqueous solution, composed of 1,4-butanediol (hereafter may also be referred to as "1,4-BD"), propylene glycol (hereafter may also be referred to as "PG") and pure water, in an amount of 0.34 part by mass, 0.56 part by mass and 3 parts by mass, respectively, was spray mixed with a high speed continuous stirring mixing machine (Turbulizer, manufactured by Hosokawa Micron Corporation) to obtain a humidified substance. The humidified substance had a temperature of 57° C.

The relevant humidified substance was continuously surface treated in a treatment amount of 40 kg/h with a conductive heat transfer-type groove-type stirring dryer (a paddle dryer; NPD-1.6W model, manufactured by Nara Machinery Co., Ltd.; Thermo Oil, Heating Oil 400, manufactured by Matsumura Oil Co., Ltd. was used as heat medium, and circulated inside a paddle of the stirring dryer; temperature of the heat medium was 205° C.). In about 1 hour of continuous operation, a nearly equilibrium state was attained, therefore temperature and dew point were measured. Results were as follows: Temperature of the humidified substance was 59° C., dew point at the exhaustion tube part of the paddle dryer (dew point) was 76° C., and material temperature at the exit of the paddle dryer was 193° C. Property measurement of the surface cross-linked water-absorbing resin, exhausted from the paddle dryer, was performed. Results thereof are shown in the following Table 1.

It should be noted that, in the present Example, the pretreatment step was performed at a part of the front part of the paddle dryer, the surface cross-linking reaction step was performed at a part of other part, and the pretreatment step and the surface cross-linking reaction step were performed in the same apparatus of the paddle dryer. In this case, temperature raising was started after the humidified substance entered the paddle dryer, and a step between temperature of the humidified substance is raised from 59° C. and reach dew point of 70° C.+10° C.=80° C.; a step from a temperature of over 86° C. to attain below 150° C.; and a step including and subsequent to the step reached 150° C.; correspond to the pretreatment step, the heat treatment step and the surface cross-linking reaction step, respectively.

Comparative Example 3

Similar operation was performed except that dew point inside the exhaustion tube was adjusted at 47° C. by introducing air to the paddle dryer, and temperature of heat medium was set at 210° C. in Example 2. In an equilibrium state, temperature of the humidified substance was 59° C., dew point was 44° C., and material temperature at the exit of the paddle dryer was 192° C. That is, start temperature of temperature increase of the humidified substance was 59° C., and is thus higher temperature than dew point by 15° C. Property measurement of the surface cross-linked water-absorbing resin, exhausted from the paddle dryer, was performed. Results thereof are shown in the following Table 1.

TABLE 1

| | GV (g/g) | AAP (g/g) | SFC ($10^{-7} \times cm^3 \times s \times g^{-1}$) |
|---|---|---|---|
| Example 1 | 28.3 | 24.7 | 56 |
| Comparative Example 1 | 28.2 | 23.0 | 39 |
| Comparative Example 2 | 27.8 | 22.7 | 43 |
| Example 2 | 28.0 | 24.5 | 60 |
| Comparative Example 3 | 28.5 | 21.5 | 29 |

As is obvious from the Table 1, the water-absorbing resin of Examples 1 and 2 shows higher values in any of AAP (g/g) and SFC ($\times 10^{-7} \cdot cm^3 \cdot s \cdot g^{-1}$), as compared with Comparative examples 1 to 3, having nearly the same GV. That is, when still more enhancement of SFC of the water-absorbing resin is challenged by a method disclosed in Comparative examples 1 to 3, it is estimated to incur increase in production cost or excessive decrease in GV. From these results, superiority of the Examples is obvious. In particular, enhancement of absorption characteristics (for example, absorbency against pressure or liquid permeation) is very effective advantage in a field of absorbing agents for hygiene materials such as disposable diapers for adults, disposable diapers for children, sanitary napkins, what is called incontinent pads and the like.

INDUSTRIAL APPLICABILITY

As described above, the surface treatment method for the water-absorbing resin of the present invention is one to provide the method for producing the surface cross-linked water-absorbing resin having stable and superior property by optimization of condition of initial stage of the heat treatment step. The surface cross-linked water-absorbing resin obtained by the present method can be utilized widely as absorbing agents for hygiene materials such as disposable diapers for adults, disposable diapers for children, sanitary napkins, what is called incontinent pads and the like, whose demand growth is significant in recent years, or as a water retention agent or a dehydrating agent or the like in a gardening and agriculture field and a civil engineering field.

The invention claimed is:

1. A surface treatment method for a water-absorbing resin comprising three steps of:
   1) a humidifying and mixing step for mixing a base polymer and a surface cross-linking agent solution to obtain a "humidified substance";
   2) a pretreatment step for raising temperature of said humidified substance to obtain a "pretreated substance"; and
   3) a surface cross-linking reaction step for cross-linking said pretreated substance to obtain a surface cross-linked "water-absorbing resin";
   wherein dew point in the pretreatment step of the above 2) is from 50° C. to 95° C., and temperature of said humidified substance is raised from temperature below the dew point up to a temperature of 10° C. higher than the dew point.

2. The surface treatment method for the water-absorbing resin according to claim 1, wherein the surface cross-linking agent is one or more compounds selected from the group consisting of a polyhydric alcohol, an epoxy compound, a polyvalent amine compound, a halo-epoxy compound, a condensed compound of the polyvalent amine compound and the halo-epoxy compound, an oxazolidinone compound, an alkylene carbonate compound and a cyclic urea compound.

3. The surface treatment method for the water-absorbing resin according to claim 1, wherein one or more steps selected from among the humidifying and mixing step, the pretreatment step and the surface cross-linking reaction step are performed in one apparatus.

4. The surface treatment method for the water-absorbing resin according to claim 1, wherein the pretreatment step and the surface cross-linking reaction step are performed in one apparatus, and temperature of said humidified substance is raised up to a temperature of 10° C. higher than the dew point, and the surface cross-linking reaction is performed by raising temperature of the humidified substance.

5. The surface treatment method for the water-absorbing resin according to claim 1, wherein the pretreatment step and the surface cross-linking reaction step are performed in one heat treatment apparatus having a rotation axis, including at least a first zone and a second zone, wherein said first zone is a zone having a dew point of from 50° C. to 95° C., which comprises raising temperature of the humidified substance from a temperature below the dew point up to the temperature of 10° C. higher than the dew point to obtain the "pretreated substance"; said second zone is a zone for further raising temperature of said pretreated substance to react said pretreated substance with the surface cross-linking agent; and in said second zone, the reaction between said pretreated substance and the surface cross-linking agent is kept at a temperature of from 150° C. to 250° C. to obtain the surface cross-linked "water-absorbing resin".

6. The surface treatment method for the water-absorbing resin according to claim 1, wherein one or more steps selected from among the humidifying and mixing step, the pretreatment step and the surface cross-linking reaction step are in a slightly reduced pressure state.

7. The surface treatment method for the water-absorbing resin according to claim 1, wherein the humidifying and mixing step, the pretreatment step and the surface cross-linking reaction step are continuously performed.

8. The surface treatment method for the water-absorbing resin according to claim 1, wherein the surface cross-linking reaction step is performed by heat treatment at 150° C. to 250° C.

9. The surface treatment method for the water-absorbing resin according to claim 1, comprising a cooling step after the surface cross-linking reaction step.

10. The surface treatment method for the water-absorbing resin according to claim 6, wherein degree of reduced pressure relative to atmospheric pressure, in the step in the reduced pressure state, is over 0 kPa and equal to or lower than 10 kPa.

11. The surface treatment method for the water-absorbing resin according to claim 1, wherein absorbency against pressure (AAP) of the water-absorbing resin is equal to or higher than 23.5 g/g and/or saline flow conductivity (SFC) is equal to or higher than 45 ($\times 10^{-7} \cdot cm^3 \cdot s \cdot g^{-1}$).

12. The surface treatment method for the water-absorbing resin according to claim 1, wherein the base polymer is a polyacrylic acid or the salt thereof-based water-absorbing resin obtained by continuous belt polymerization or continuous kneader polymerization.

13. A production method for a water-absorbing resin comprising the surface treatment method set forth in claim 1.

14. The surface treatment method for the water-absorbing resin according to claim 2, wherein one or more steps selected from among the humidifying and mixing step, the pretreatment step and the surface cross-linking reaction step are performed in one apparatus.

15. The surface treatment method for the water-absorbing resin according to claim 2, wherein the pretreatment step and the surface cross-linking reaction step are performed in one apparatus, and temperature of said humidified substance is raised up to a temperature of 10° C. higher than the dew point, and the surface cross-linking reaction is performed by raising temperature of the humidified substance.

16. The surface treatment method for the water-absorbing resin according to claim 3, wherein the pretreatment step and the surface cross-linking reaction step are performed in one apparatus, and temperature of said humidified substance is raised up to a temperature of 10° C. higher than the dew point, and the surface cross-linking reaction is performed by raising temperature of the humidified substance.

17. The surface treatment method for the water-absorbing resin according to claim 14, wherein the pretreatment step and the surface cross-linking reaction step are performed in one apparatus, and temperature of said humidified substance is raised up to a temperature of 10° C. higher than the dew point, and the surface cross-linking reaction is performed by raising temperature of the humidified substance.

18. The surface treatment method for the water-absorbing resin according to claim 2, wherein the pretreatment step and the surface cross-linking reaction step are performed in one heat treatment apparatus having a rotation axis, including at least a first zone and a second zone, wherein said first zone is a zone having a dew point of from 50° C. to 95° C., which comprises raising temperature of the humidified substance from a temperature below the dew point up to the temperature of 10° C. higher than the dew point to obtain the "pretreated substance"; said second zone is a zone for further raising temperature of said pretreated substance to react said pretreated substance with the surface cross-linking agent; and in said second zone, the reaction between said pretreated substance and the surface cross-linking agent is kept at a temperature of from 150° C. to 250° C. to obtain the surface cross-linked "water-absorbing resin".

19. The surface treatment method for the water-absorbing resin according to claim 3, wherein the pretreatment step and the surface cross-linking reaction step are performed in one heat treatment apparatus having a rotation axis, including at least a first zone and a second zone, wherein said first zone is a zone having a dew point of from 50° C. to 95° C., which comprises raising temperature of the humidified substance from a temperature below the dew point up to the temperature of 10° C. higher than the dew point to obtain the "pretreated substance"; said second zone is a zone for further raising temperature of said pretreated substance to react said pretreated substance with the surface cross-linking agent; and in said second zone, the reaction between said pretreated substance and the surface cross-linking agent is kept at a temperature of from 150° C. to 250° C. to obtain the surface cross-linked "water-absorbing resin".

20. The surface treatment method for the water-absorbing resin according to claim 4, wherein the pretreatment step and the surface cross-linking reaction step are performed in one heat treatment apparatus having a rotation axis, including at least a first zone and a second zone, wherein said first zone is a zone having a dew point of from 50° C. to 95° C., which comprises raising temperature of the humidified substance from a temperature below the dew point up to the temperature of 10° C. higher than the dew point to obtain the "pretreated substance"; said second zone is a zone for further raising temperature of said pretreated substance to react said pretreated substance with the surface cross-linking agent; and in said second zone, the reaction between said pretreated substance and the surface cross-linking agent is kept at a temperature of from 150° C. to 250° C. to obtain the surface cross-linked "water-absorbing resin".

\* \* \* \* \*